US007340390B2

(12) United States Patent
Hurst et al.

(10) Patent No.: US 7,340,390 B2
(45) Date of Patent: *Mar. 4, 2008

(54) MOBILE COMMUNICATION TERMINAL AND METHOD THEREFORE

(75) Inventors: Leon Hurst, Helsinki (FI); Juha Iso-Sipila, Tampere (FI)

(73) Assignee: Nokia Corporation, Espoo (FI)

( * ) Notice: Subject to any disclaimer, the term of this patent is extended or adjusted under 35 U.S.C. 154(b) by 95 days.

This patent is subject to a terminal disclaimer.

(21) Appl. No.: 11/267,936

(22) Filed: Nov. 4, 2005

(65) Prior Publication Data

US 2006/0129680 A1    Jun. 15, 2006

Related U.S. Application Data

(63) Continuation-in-part of application No. 10/976,093, filed on Oct. 27, 2004.

(51) Int. Cl.
| | |
|---|---|
| G06F 17/20 | (2006.01) |
| G06F 17/27 | (2006.01) |
| G10L 15/00 | (2006.01) |
| H04Q 7/22 | (2006.01) |
| H04Q 7/38 | (2006.01) |

(52) U.S. Cl. ............... 704/8; 704/9; 704/255; 704/256; 455/412.1; 455/414.4

(58) Field of Classification Search ................ 455/414, 455/412.1, 412.2; 345/171; 379/88.06, 379/142; 704/8, 10
See application file for complete search history.

(56) References Cited

U.S. PATENT DOCUMENTS

| | | | | |
|---|---|---|---|---|
| 4,916,730 | A * | 4/1990 | Hashimoto | 379/70 |
| 5,701,497 | A * | 12/1997 | Yamauchi et al. | 704/3 |
| 6,363,342 | B2 * | 3/2002 | Shaw et al. | 704/220 |
| 2001/0049738 | A1 * | 12/2001 | Doi | 709/228 |
| 2002/0046035 | A1 * | 4/2002 | Kitahara et al. | 704/277 |
| 2004/0102957 | A1 * | 5/2004 | Levin | 704/3 |
| 2005/0114114 | A1 * | 5/2005 | Rudolph | 704/10 |

FOREIGN PATENT DOCUMENTS

EP        1480420 A1 * 11/2004

\* cited by examiner

*Primary Examiner*—Rafael Perez-Gutierrez
*Assistant Examiner*—My X Nguyen
(74) *Attorney, Agent, or Firm*—Perman & Green, LLP

(57) ABSTRACT

A method for organizing data records in a memory in a mobile telecommunication terminal is disclosed. The method comprises receiving a plurality of digits, which identify a subscriber terminal in a telecommunication network, in a control unit in the mobile, telecommunication terminal. The method moreover comprises storing the plurality of digits in a memory in the mobile telecommunication terminal, and associating the plurality of digits with dictionary selection data designating at least one dictionary stored in the memory.

16 Claims, 19 Drawing Sheets

MOBILE COMMUNICATION TERMINAL AND METHOD THEREFORE

This application is a continuation-in-part of prior application Ser. No. 10/976,093, filed on Oct. 27, 2004, application pending.

BACKGROUND

1. Field

The present invention generally relates to mobile telecommunication terminals, and more specifically to methods and apparatus for facilitating communication by means of mobile telecommunication terminals in a multilingual environment.

2. Brief Description of Related Developments

By the increased use of mobile telecommunication terminals many people are given the opportunity to get in contact with each other practically anywhere at any time. The contact may take the form of e.g. a voice call or a short text message. Examples of systems for providing these kinds of mobile services are DAMPS, PCM, GSM and UMTS.

In particular, the use of mobile telecommunication terminals for sending and receiving messages by means of for example, Short Messaging Service (SMS), Enhanced Messaging Service (EMS), Multimedia Messaging Service (MMS), Email and Instant Messaging (TM) has become very popular due to their fast and convenient way of exchanging information. By using a messaging service rather than establishing a voice communication, a user may not only save time but also money since the cost for sending a message is generally much lower than the cost for placing for example, a telephone call. Additionally, a received message may be stored in the mobile telecommunication terminal for later retrieval, a feature that is beneficial if the message for example, comprises an address, a schedule for a meeting, a telephone number etc.

Even though many mobile telecommunication terminals include functionality for sending and receiving messages, the way of entering text in the message is in most cases cumbersome due to the generally small size of the mobile telecommunication terminal. More specifically, the size of the input unit in a mobile telecommunication terminal, for example, a keyboard, an on-screen touch-sensitive keyboard or a navigation wheel or a joystick, is restricted by the overall size of the mobile telecommunication terminal, which makes entry of larger amounts of text cumbersome.

One way to facilitate the entering of text in mobile telecommunication terminals is by the provision of text prediction software, such as T9 from Tegic Communications, 1000 Dexter Avenue N., Suite 300, Seattle, Wash. 98109 USA. The text prediction software generally uses one or more dictionaries, which comprise commonly used words in different languages. For example, an English dictionary comprises words such as car, train, meeting, hour, etc. while a corresponding German dictionary comprises words such as Auto, Zug, Tagung, Stunde, etc. When a user of a mobile telecommunication terminal currently using an English dictionary is entering the letters "ho", the prediction software displays a list of words starting with the letters "ho", such as for example, the word "hour", whereupon the user may select the word instead of entering all letters of that specific word.

However, even though the use of text prediction software facilitates the entering of text in a message, the user is still faced with the problem of selecting a suitable dictionary to use. For example, an English user with German friends may once in a while want to enter text in German. The user in this situation is compelled to switch dictionary language every time he or she addresses recipients with different native tongue. The problem of selecting correct dictionary language in a multi-language environment is even more eminent when a user is roaming and wants to change between many different dictionary languages many times a day. For example, a user who travels through Europe on a business trip may want to send messages many times a day for booking meetings, making reservations at hotels, etc., in different languages depending on his current location.

Some mobile telecommunication terminals provide text recognition and text to speech functions that provide voice feedback to a user. However, in speech recognition, automatic language identification from text is used but not very reliable. In addition, if the language of the sender is not known, the pronunciation of the contact name or words in the message may be unrecognizable or difficult to understand such as for example, when playing a prompt, such as a contact name from the phone book, or playing back a message using the voice user interface. For example, where an English user wants to play back a message in the Finnish language, using the voice user interface, the pronunciation of the words in the message would be far from perfect without switching the dictionary to a Finnish language dictionary. The same holds true when playing a prompt, such as for example, a contact name from the phone book. For example, if the name John Smith were played back with a Finnish language text to speech function, the pronunciation would not be correct. This is even more problematic where the user has contacts from several different countries and/or receives several messages in several different languages.

There is a need for a fast and reliable method for selecting a dictionary to use when using a text prediction scheme for entering text in a message or when playing a prompt or a message using a voice user interface.

SUMMARY

The object of the present invention is to overcome the above-described problems, of the known technologies in regard to selecting a language to use when entering text in a message.

A particular advantage of the present invention is the provision of a simple and reliable method for automatic language selection when entering text into or using text recognition or text to speech functionalities of a mobile telecommunication terminal.

A particular feature of the present invention relates to the provision of a mobile telecommunication terminal for organizing data records in a memory thereof.

The above objects, advantages and features together with numerous other objects, advantages and features, which will become evident from the detailed description below, are obtained according to a first aspect of the present invention by a method for organizing data records in a memory in a mobile telecommunication terminal. The method includes receiving a plurality of digits in a control unit in the mobile telecommunication terminal. The digits identify a subscriber terminal in a telecommunication network. The plurality of digits are stored in a memory in the mobile telecommunication terminal and the plurality of digits are associated with dictionary selection data designating at least one dictionary stored in the memory.

According to one embodiment, the method comprises determining if the plurality of digits comprise a country code. If the plurality of digits comprise a country code, the plurality of digits are associated with dictionary selection data designating at least one dictionary stored in the memory, which dictionary is in a language corresponding to the country code.

According to one embodiment, the method comprises determining if the plurality of digits comprise a country code. If the plurality of digits do not comprise a country code, the plurality of digits are associated with dictionary selection data designating at least one default dictionary stored in the memory.

According to one embodiment, the method comprises determining, from the sequential structure of the digits, in which country the plurality of digits relate to a subscriber number, and associating the plurality of digits with dictionary selection data designating at least one dictionary stored in the memory, which dictionary is in a language corresponding to the country in which the plurality of digits relate to a subscriber number.

According to one embodiment, the method comprises presenting on a display in the mobile telecommunication terminal, for selection, data identifying at least one dictionary. A selection of at least one dictionary is received and the plurality of digits is associated with dictionary selection data designating at least one dictionary based on said received selection.

According to one embodiment, the method comprises storing the dictionary selection data together with said plurality of digits in a database record in the memory.

According to another aspect of invention, a mobile telecommunication terminal comprises a memory comprising at least one dictionary in a predetermined language and a control unit. The control unit is adapted to receive a plurality of digits, said digits identifying a subscriber terminal in a telecommunication network, and associate the plurality of digits with dictionary selection data designating at least one dictionary stored in the memory.

According to another aspect of the invention, a method for entering text in a mobile telecommunication terminal comprises reading a first set of digits from a memory in the mobile telecommunication terminal. The first set of digits identify a subscriber terminal in a telecommunication network. First dictionary selection data are read, which are associated with the first set of digits, and designate at least one dictionary stored in the memory, from the memory. The at least one designated dictionary stored in the memory is selected based on said first dictionary selection data. One or more characters are received in the control unit, and one or more words from the dictionary based on the received characters are presented, for selection, on a display in the mobile telecommunication terminal.

According to one embodiment, the method comprises reading a second set of digits from the memory in the mobile telecommunication terminal. The second set of digits identify a subscriber terminal in a telecommunication network. Second dictionary selection data is read from the memory. The second dictionary selection data is associated with the second set of digits and designates at least one dictionary stored in the memory. It is determined if the first dictionary selection data and the second dictionary selection data correspond. If the first dictionary selection data and the second dictionary selection data correspond, the at least one designated dictionary stored in the memory is selected based on the corresponding dictionary selection data.

According to one embodiment, the method comprises selecting at least one default dictionary stored in the memory if first and second dictionary selection data do not correspond.

According to another aspect of the invention, a mobile telecommunication terminal comprises a display, a memory comprising a first set of digits identifying a subscriber terminal in a telecommunication network and a control unit. The control unit is adapted to read the first set of digits from the memory; read first dictionary selection data, which are associated with the first set of digits and designate at least one dictionary stored in the memory, from the memory; select the at least one designated dictionary stored in the memory based on said first dictionary selection data; receive one or more characters; and present on the display, for selection, one or more words from the dictionary based on the received characters.

According to another aspect of the invention, a method for entering text in a mobile telecommunication terminal comprises receiving a plurality of digits in a control unit in the mobile telecommunication terminal. The plurality of digits identify a subscriber terminal in a telecommunication network. It is determined if the plurality of digits comprise a country code. If the plurality of digits comprise a country code, at least one dictionary stored in a memory in the mobile telecommunication terminal is selected, which dictionary is in a language corresponding to the country code. One or more characters is received in the control unit and one or more words are presented from the dictionary, for selection, based on the received characters.

According to one embodiment, the method comprises selecting at least one default dictionary stored in the memory if the received plurality of digits do not comprise a country code.

According to another aspect of the invention, a mobile telecommunication terminal comprises a display, a memory comprising at least one dictionary, and a control unit. The control unit is adapted to receive a plurality of digits, said digits identifying a subscriber terminal in a telecommunication network; determine if the plurality of digits comprise a country code, if the plurality of digits comprise a country code, select at least one dictionary stored in the memory, which dictionary is in a language corresponding to the country code; receive one or more characters in the control unit; and present on the display, for selection, one or more words from the dictionary based on the received characters.

According to another aspect of the invention, a method for entering text in a mobile telecommunication terminal includes receiving a plurality of digits in a control unit in the mobile telecommunication terminal. The plurality of digits identify a subscriber terminal in a telecommunication network. It is determined, from the sequential structure of the digits, in which country the plurality of digits relate to a subscriber number. At least one dictionary stored in the memory is selected, which dictionary is in a language corresponding to the country in which the plurality of digits relate to a subscriber number. One or more characters are received in the control unit and one or more words from the dictionary are presented, for selection, based on the received characters.

According to another aspect of invention, a mobile telecommunication terminal includes a display, a memory comprising at least one dictionary and a control unit. The control unit is adapted to receive a plurality of digits, said digits identifying a subscriber terminal in a telecommunication network; determine, from the sequential structure of the digits, in which country the plurality of digits relate to a subscriber number; select at least one dictionary stored in the memory, which dictionary is in a language corresponding to the country in which the plurality of digits relate to a subscriber number; receive one or more characters in the control unit; and present on the display, for selection, one or more words from the dictionary based on the received characters.

According to another aspect of the invention, a mobile telecommunication terminal comprises a memory comprising a database with records, each record comprising a plurality of digits identifying a subscriber in a telecommunications network, and dictionary selection data designating at least one dictionary stored in the memory.

According to another embodiment a method for audibly presenting text associated with a message in a mobile telecommunication terminal is provided. The method includes reading a first set of digits from a memory in the mobile telecommunication terminal, the first set of digits identifying a subscriber terminal in a telecommunication network and automatically selecting at least one dictionary associated with the first set of digits. At least one character associated with a data record or an incoming or outgoing message is received in the control unit. The at least one character is audibly presented in a language associated with the dictionary.

In accordance with an embodiment, a mobile telecommunication terminal is provided. The mobile telecommunication terminal includes a control unit and a memory coupled to the control unit. The memory includes at least one dictionary. The mobile telecommunication terminal also comprises a receiving means for receiving a code, the code identifying a subscriber terminal in a telecommunication network; a selecting means for selecting at least one designated dictionary stored in the memory in accordance with data associated with the code; a receiving means for receiving at least one character in the control unit; and an audible presentation means for audibly presenting, through the at least one speaker, one or more words from the dictionary based on the received at least one character.

In accordance with another embodiment, a method for organizing data records in a memory in a mobile telecommunication terminal is provided. The method includes receiving contact information in the mobile telecommunication terminal. The contact information identifying a subscriber contact in a telecommunication network. A language tag associated with the contact information is received or identified. The contact information and language tag are stored in a memory of the mobile telecommunication terminal. The language tag is associated with at least one dictionary stored in the memory corresponding to the language tag via a control unit in the mobile telecommunication terminal and the contact information is associated with the dictionary.

In accordance with another embodiment, a method for entering text in a mobile telecommunication terminal is provided. The method includes selecting a record from a memory of the mobile telecommunication terminal and determining if a language tag is associated with the record. The language tag associated with the record is read with a control unit in the mobile telecommunication terminal. A dictionary designated by the language tag is selected with a control unit in the mobile telecommunication terminal. A code is received in the mobile telecommunication terminal corresponding to a language associated with the selected dictionary in the mobile telecommunication terminal. One or more words from the selected dictionary corresponding to the code are presented on a display for selection.

In accordance with another embodiment, a method for automatically selecting a language in a mobile telecommunication terminal is provided. The method includes selecting a data record from a memory of the mobile telecommunication terminal for display, wherein the mobile telecommunication terminal automatically determines if a language tag is associated with the record. The method also includes automatically associating a dictionary designated by the language tag to the record.

BRIEF DESCRIPTION OF THE DRAWINGS

The foregoing aspects and other features of the present invention are explained in the following description, taken in connection with the accompanying drawings, wherein.

DETAILED DESCRIPTION OF THE EXEMPLARY EMBODIMENTS

Figure 1:
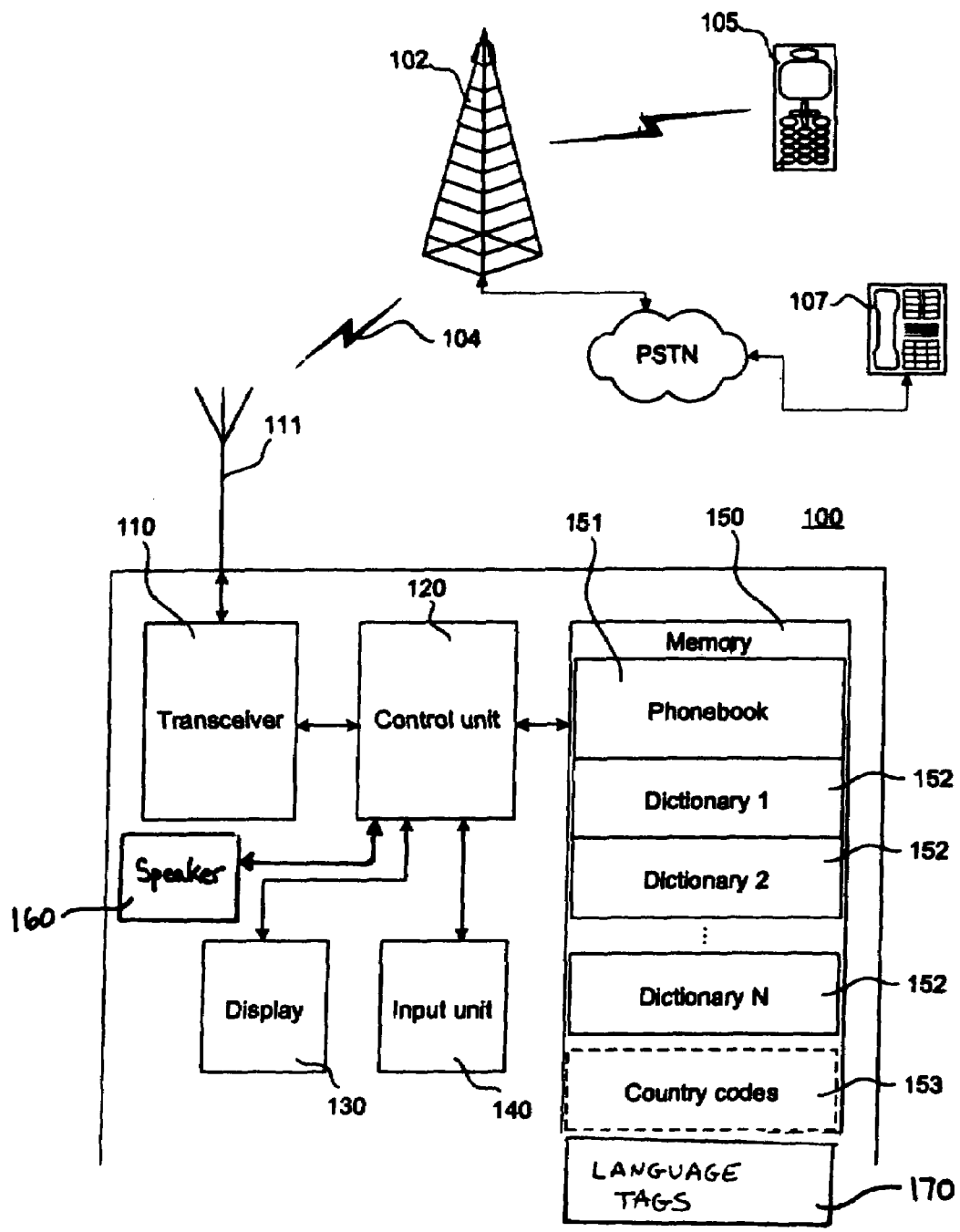
FIG. 1 illustrates a mobile telecommunication terminal according to an exemplary embodiment.

Although the present invention will be described with reference to the exemplary embodiments shown in the drawings and described below, it should be understood that the present invention can be embodied in many alternate forms of embodiments. In addition, any suitable size, shape or type of elements could be used.

FIG. 1 is a schematic block diagram of a mobile telecommunication terminal 100 according to an exemplary embodiment of the present invention. A transceiver 110 is used for communicating with a base station 102 via an antenna 111. The base station 102 is in communication with other mobile telecommunication terminals 105 via a mobile communications network, and stationary terminals 107 via for example, a public switched telephone network (PSTN). The transceiver 110 may be arranged to operate in various frequency bands, such as 880-915 MHz and 925-960 MHz (GSM900), 1710-1785 MHz and 1505-1880 MHz (GSM1800), 1850-1910 MHz and 1930-1990 MHz (GSM1900), and 1885-2025 MHz and 2110-2200 MHz (UMTS). It is appreciated that other frequency bands are equally possible depending on the specifications of the network in which the mobile telecommunication terminal 100 is to operate.

A control unit 120 is coupled to the transceiver 110. The control unit 120 may comprise signal processing circuitry in order to process for example, voice data from a user of the mobile telecommunication terminal 100 and provide the transceiver 110 with the processed data for transmission to the base station 102. Likewise, the control unit 120 may comprise signal processing circuitry for processing data received from the other telecommunication terminals 105, 107 in order to provide the user of the mobile telecommunication terminal 100 with for example, audio, image or video data. Alternatively, some or all of the signal processing functionality may be provided by specialized circuitry (not shown) in the mobile telecommunication terminal 100.

The control unit 120 is coupled to a display 130 and speaker 160 for providing a user of the mobile telecommunication terminal 100 with visual and audio or voice data regarding for example, a specific call in progress, telecommunication numbers stored in the mobile telecommunication terminal 100, signal strength of the wireless communication link 104, messages received from other mobile telecommunication terminals, etc. In particular, the display may provide the user of the mobile telecommunication terminal 100 with data regarding the current language used for predicting a word being entered when writing a text message. The display 100 may also provide the user of the mobile telecommunication terminal 100 with data regarding the current language used for the recognition or pronunciation of text in text recognition and/or text to speech (TTS) functionalities of the mobile telecommunication terminal 100 such as for example, playing a TTS prompt or playing back a text message. The speaker 160 may provide the user of the mobile telecommunication terminal 100 with audio or voice feedback regarding a voice interface functionality of the mobile telecommunication terminal 100.

The control unit 120 is moreover coupled to an input unit 140, which may be any suitable type of input, for example, an input in the form of or any combination of a microphone, keyboard, an on-screen touch-sensitive keyboard, a navigation wheel or joystick for scrolling and selecting items, digits and/or characters shown on the display 120, etc. The input unit 140 may be integral with the mobile telecommunication terminal 100 or separate from the mobile telecommunication terminal 100, wherein the input unit is connected to the mobile telecommunication terminal when needed. The mobile telecommunication terminal 100 may alternatively be provided with an integral input unit 140 in the form of a navigation wheel for normal use as well as a connector for connecting an external input unit in the form of a keyboard for entering larger amounts of text (not shown).

A memory 150 is connected to the control unit 120 and may have a computer readable code or a text to speech algorithm (not shown), which is used by the control unit 120, for converting text for text recognition and/or TTS functionalities of the mobile telecommunications terminal 100. In alternate embodiments, some or all of the text recognition and/or TTS functionalities may be provided by specialized circuitry (not shown) in the mobile telecommunication terminal 100.

The memory may also have a list of telecommunication numbers 151, hereinafter referred to as a "phonebook", which facilitates the establishing, of communications to other terminals connected to the network. A user of the mobile telecommunication terminal 100 may use the phonebook 151 for storing telecommunication numbers in different formats, for example, the telecommunication numbers may be stored as subscriber numbers or international telecommunication numbers, i.e. telecommunication numbers comprising a country code.

The memory 150 also comprises one or more dictionaries 152 that may improve the entering of text in the mobile telecommunication terminal 100 by means of the input unit 140. The dictionaries 152 may also improve the quality of text recognition and TTS functionalities of the mobile telecommunication terminal 100. More specifically, as described above, each dictionary 152 comprises words from one specific language. Depending on, the available memory, size and the desired number of dictionaries 152 to use, each dictionary 152 may comprise more or less words from each specific language. In case of a small available memory size, each dictionary 152 may comprise only the most frequently used words in each language, while a large available memory size may permit a more complete list of words in each dictionary 152. The control unit 120 may be adapted to use more than one dictionary 152 simultaneously. For example, a user of the mobile telecommunication terminal 100 may be provided with a Euro dictionary which may be a combination of an English, a German and a French dictionary 152.

It is furthermore appreciated that one or more dictionaries 152 in the memory 150 may be user specific dictionaries 152 which are compiled by the user after purchase of the mobile telecommunication terminal 100. The user specific dictionaries 152 may comprise words that are not present in any other, language specific, dictionary 152. Additionally, one or more of the dictionaries may be organized from an application rather than a language perspective, for example, the dictionaries may comprise words from a specific field of application, such as economics, computer science, telecommunications, etc. For example, persons working in a financial department may use an economy or economics specific dictionary in addition to any other language specific dictionary.

The memory 150 may also comprise a list of different country codes 153 according to, ITU recommendation E.164 from, the International Telecommunication Union (ITU). Examples of country codes are 46 for Sweden, 45 for Denmark, 47 for Norway, 49 for Germany etc.

In addition to the dictionaries 152 and country codes 153, the memory 150 may also comprise a list of different language tags 170. The language tags 170 may be associated with an entry in the phonebook 151 and may indicate a language or nationality of the person or contact to which each phonebook entry relates.

It is understood in this context that the memory 150 may be a single memory or many different memories implemented by means of different technologies (such as RAM, ROM, EPROM, EEPROM, Flash, etc.) which are all accessible by the control unit 120.

Figure 2:
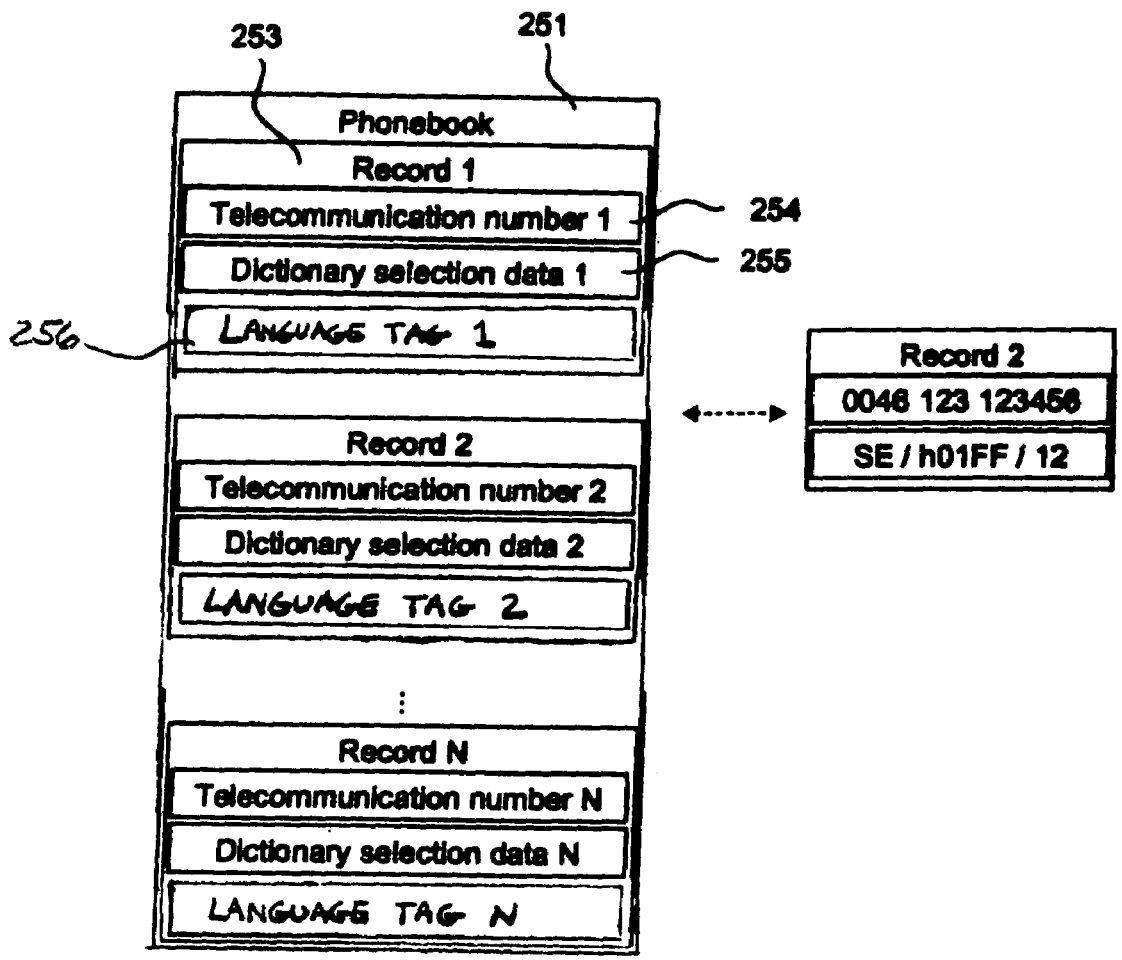
FIG. 2 is a schematic block diagram illustrating a memory organization according to an exemplary embodiment.

FIG. 2 is a schematic block diagram illustrating an exemplary memory organization according to one embodiment of the present invention. The phonebook 251 stored in the memory 150 is adapted to store one or more data records 253 which, in addition to a telecommunication number to another user, also comprises dictionary selection data 255 and language tags 256. The telecommunication number may be for example, a subscriber number used for establishing a communication with another user in the same telecommunications network as the mobile telecommunication terminal or an international telecommunication number comprising a country code. It is appreciated that the telecommunication number may also comprise a national significant number if the current telecommunication network standard so requires.

The dictionary selection data may, in one embodiment, be a series of characters identifying the language of the desired dictionary 152 (e.g. SE for Sweden). The dictionary selection data may also be in the form of an address (e.g. hO1FF) pointing out a start address of the desired dictionary in the memory 150. The dictionary selection data may also be in the form of a variable indicating the ordinal number (e.g. 12) of the desired dictionary 152 in a sequence of dictionaries in the memory 150.

The language tags 256 may, in one embodiment, be a series of characters, numerals, or any suitable code identifying the language or nationality of the person or contact to which the record 253 relates. The language tag 256 may be used to automatically indicate a desired dictionary 152 to be used during text input when writing a message, automatic language selection for an in device answering machine or for the accurate determination of a TTS or speech recognition language to be used with a particular contact. The language tag may indicate the use of the same or a different dictionary than that specified by the dictionary selection data 255.

It is understood that the records besides the telecommunication number 254, the dictionary selection data 255 and the language tags 256 may also comprise additional fields, such as for example, an address, an email address, a fax number etc.

Figure 3:
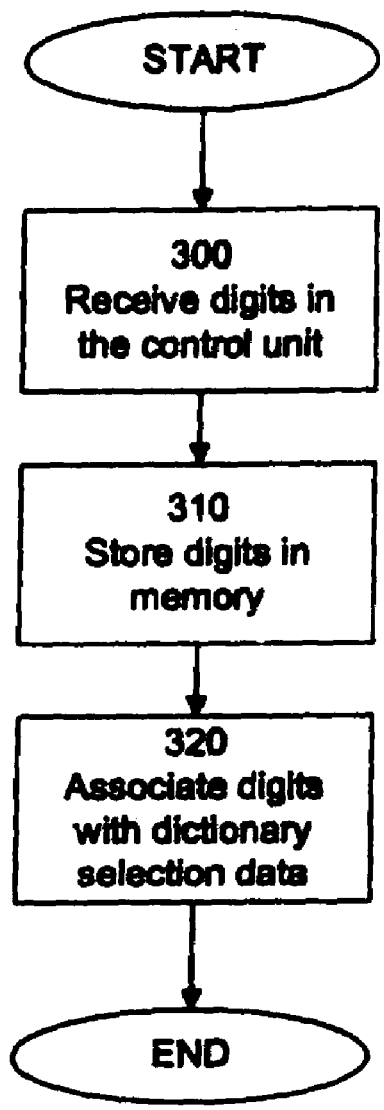
FIG. 3 is a schematic graph illustrating a method for organizing data records in a memory in a mobile telecommunication terminal according to a first aspect of an exemplary embodiment.

FIG. 3 is a schematic graph illustrating a method for organizing data records in a memory 150 in a mobile telecommunication terminal 100 according to a first aspect of an exemplary embodiment.

In this embodiment, the control unit 120 in block 300 receives digits from either the input unit 140 or the memory 150 that identify a subscriber terminal 105, 107 in a telecommunication network. In the latter case, the user selects a previously stored telecommunication number from the phonebook 151 in the memory 150. In the former case, the user of the mobile telecommunication terminal 100, when he or she wants to store a telecommunication number used for establishing a communication with another terminal 105, 107, inputs a series of digits on the input unit 140 by for example, pressing the appropriate keys on a keyboard or selecting the digits by means of a navigation wheel and the display 130. In alternate embodiments, the user may input the digits by speaking the digits into the input unit 140 via, for example, a microphone (not shown) so they are recognized by a voice recognition functionality of the mobile telecommunications device. It is appreciated that the receiving functionality provided by the control unit 120 may also be implemented by means of specific hardware, such as a Field Programmable Gate Array (FPGA), an Application specific Integrated Circuit (ASIC), discrete logic etc.

The user may then, in block 310, instruct the control unit 120 to store the plurality of digits corresponding to the telecommunication number in the memory 150 in the mobile telecommunication terminal 100. If the digits are read from the memory 150 and received in the control unit 120, the user does not have to remember the specific digits. The telecommunication numbers in the phonebook 151 may be associated with the name of a person or company, wherein the name rather than the numbers are displayed for selection on the display 130.

In block 320, the control unit 120 associates the plurality of digits with dictionary selection data designating at least one dictionary 152 stored in the memory 150. As mentioned above, the control unit 120 may be adapted to use more than one dictionary 152 simultaneously. For example, the dictionary selection data may designate a Euro dictionary that may be a multi-designation of an English, a German and a French dictionary 152. The association may be stored in a data field 255 in the same record 253 in the phonebook 251 or as a pointer which links the dictionary selection data 255 designating a specific dictionary 152 stored in the memory 150 to the telecommunication number 254. It is appreciated that the associating functionality provided by the control unit 120 may also be implemented by means of specific hardware, such as a Field Programmable Gate Array (FPGA), an Application specific Integrated Circuit (ASIC), discrete logic etc.

Figure 4:
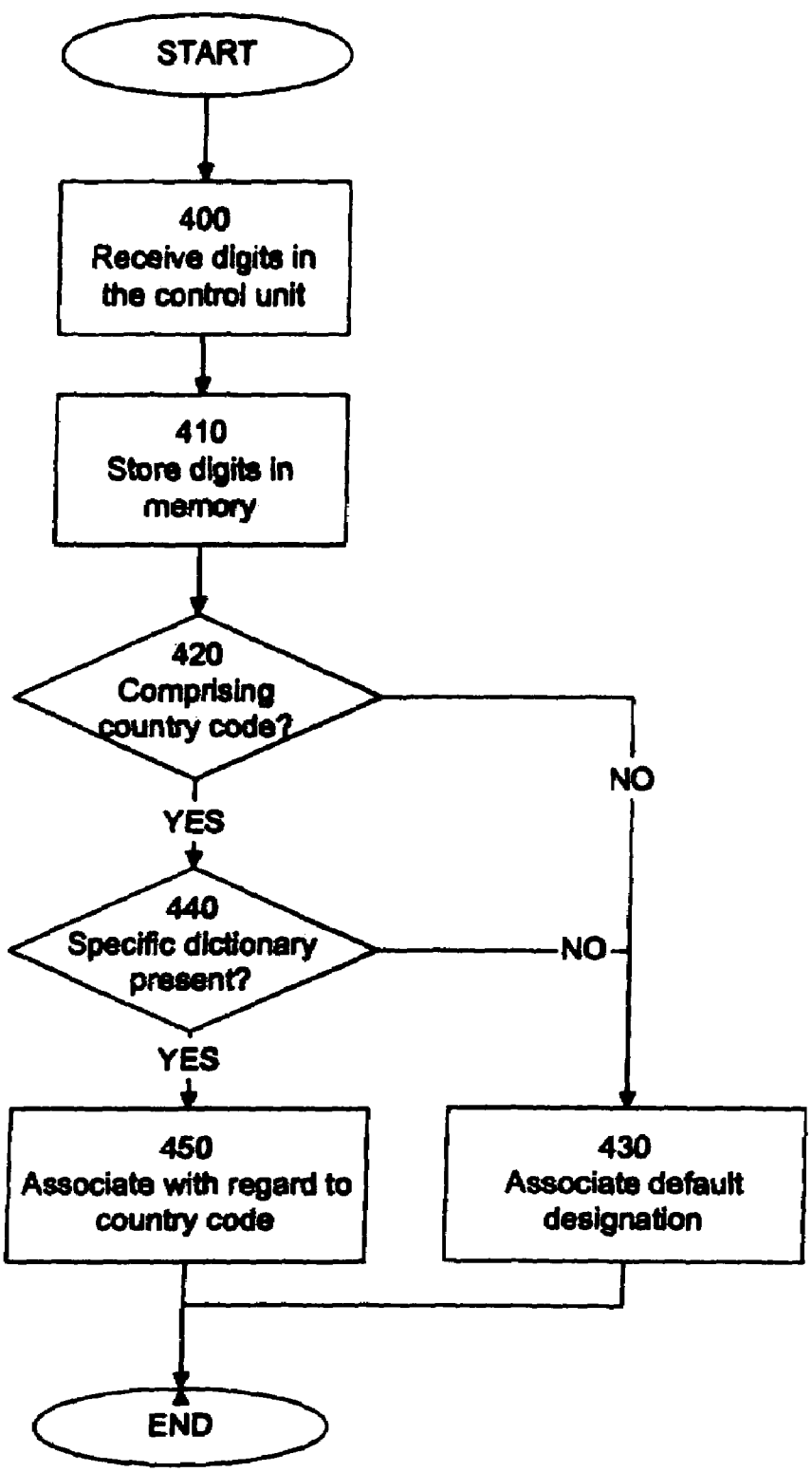
FIG. 4 is an illustration in more detail of a method for associating a telecommunication number with a specific dictionary according to an exemplary embodiment.

FIG. 4 is an illustration in more detail of a method for associating a telecommunication number with a specific dictionary according to an exemplary embodiment. Blocks 400 and 410 correspond to the blocks 300 and 310 disclosed above.

In block 420 the control unit 120 determines if one or more of the digits entered by means of the input unit 140 or read out of the memory 150 correspond to a country code. A simple and straightforward method for determining if the digits comprise a country code is to compare the first digits in the received sequence of digits with the country codes 153 stored in the memory 150. More complex schemes taking the structure of the entire sequence of digits into account is, however, equally possible. It is appreciated that the determining functionality provided by the control unit 120 may also be implemented by means of specific hardware, such as a Field Programmable Gate Array (FPGA), an Application specific Integrated Circuit (ASIC), discrete logic etc. If the digits do not correspond to a country code, the control unit, in block 430, associates the plurality of digits with dictionary selection data designating a default dictionary, such as an English dictionary.

If the plurality of digits comprise a country code, the control unit 120 in block 440 determines if a dictionary 152 in a language corresponding to the country code is present in the memory 150. That is, for example, if the telecommunication number comprises the country code 46, the control unit 120 determines if the memory 150 comprises a dictionary in Swedish.

If there is no dictionary 152 stored in the memory 150 that is in a language corresponding to the country code, the routine jumps to block 430, wherein the control unit associates the plurality of digits with dictionary selection data designating at least one default dictionary stored in the memory 150.

However, if the memory 150 comprises a dictionary in a language specified by the country code, the control unit 120 in block 450 associates the plurality of digits with dictionary selection data 255 designating at least one dictionary 152 which is in a language corresponding to the country code. As mentioned above, the control unit 120 may be adapted to use more than one dictionary 152 simultaneously. The dictionary selection data may, for example, designate a Euro dictionary, which may be a multi-designation of an English, a German, and a French dictionary 152. Alternatively, the control unit 120 may use the display 130 for presenting data identifying one or more countries or languages corresponding to the country code. The user may then select the country or language wherein the control unit 120 associates the plurality of digits with dictionary selection data 255 designating at least one dictionary 152 which is in a language corresponding to the country code.

Figure 5:
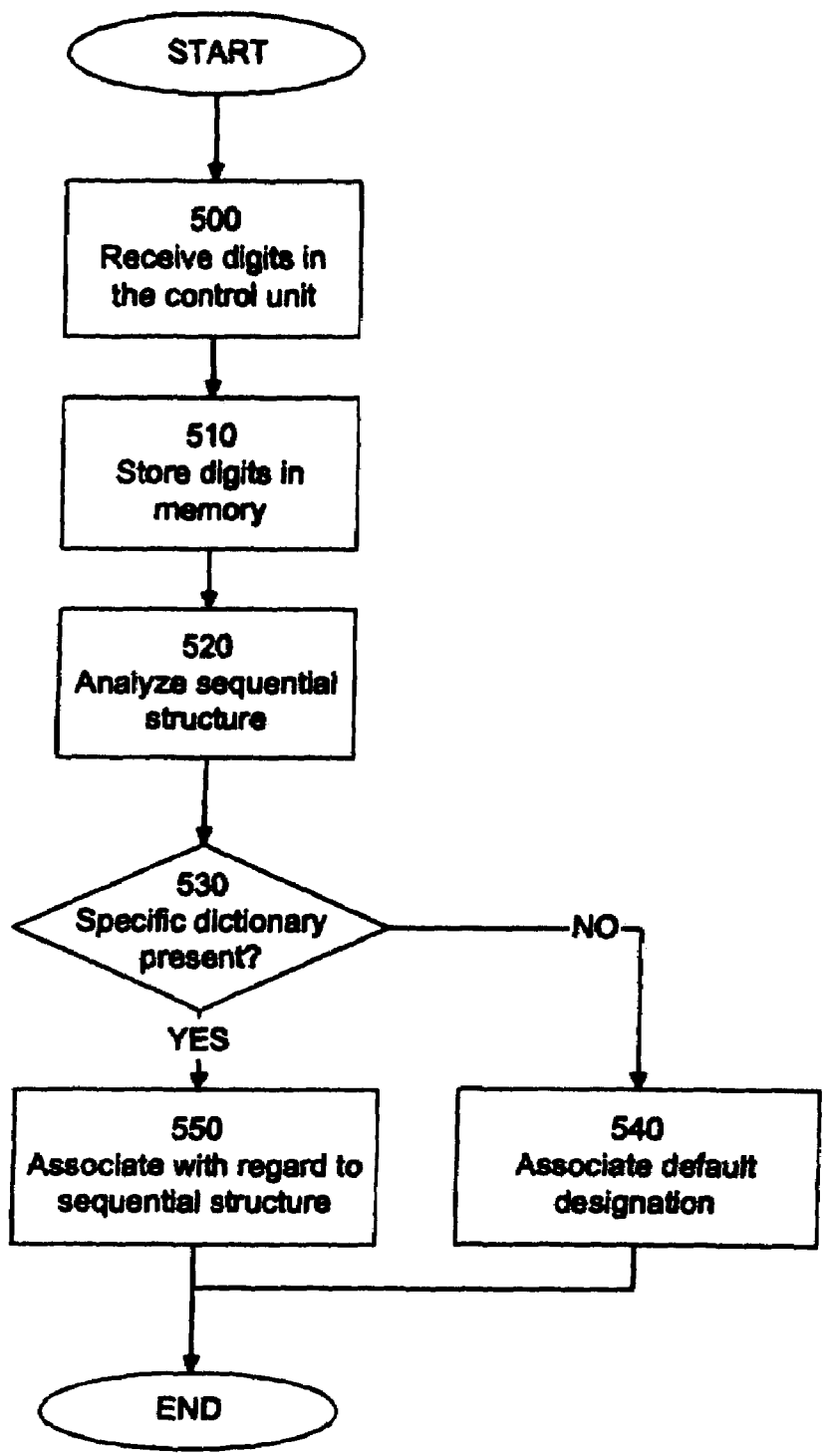
FIG. 5 is an illustration in more detail of a method for associating a telecommunication number with a specific dictionary according to an exemplary embodiment.

FIG. 5 is an illustration in more detail of a method for associating a telecommunication number with a specific dictionary according to another exemplary embodiment. Blocks 500 and 510 correspond to the blocks 300 and 310 disclosed above.

In block 520, the control unit 120 analyzes the sequential structure of the sequence of digits received in block 500. The analysis may be based on the numbering structure found in ITU recommendation E.164 or any other suitable numbering structure. By comparing the sequential structure of the received digits with the different numbering structures found in different countries, the control unit 120 may determine in which country the plurality of digits relates to a subscriber number. It is appreciated that the analyzing functionality provided by the control unit 120 may also be implemented by means of specific hardware, such as a Field Programmable Gate Array (FPGA), an Application specific Integrated Circuit (ASIC), discrete logic etc.

The control unit 120, in block 530, determines if a dictionary 152 in a language corresponding to the country in which the plurality of digits relates to a subscriber number is present in the memory 150. That is, for example, if sequential structure of the telecommunication number points out Sweden, the control unit 120 determines if the memory 150 comprises a dictionary in Swedish.

If there is no dictionary 152 in a language corresponding to the country in which the plurality of digits relate, the routine jumps to block 540, wherein the control unit associates the plurality of digits with dictionary selection data designating at least one default dictionary stored in the memory 150.

However, if the memory 150 comprises a dictionary in a language specified by the sequential structure of the telecommunication number, the control unit 120 in block 550 associates the plurality of digits with dictionary selection data 255 designating at least one dictionary 152 stored in the memory, which dictionary 152 is in a language corresponding to the country in which the plurality of digits relates to a subscriber number.

Alternatively, the control unit 120 may use the display 130 for presenting data identifying one or more countries in which the plurality of digits relates to a subscriber number. The user may then select a specific country whereupon the control unit 120 associates the plurality of digits with dictionary selection data 255 designating a dictionary 152 in a language corresponding to the country in which the plurality of digits relates to a subscriber number.

Figure 6:
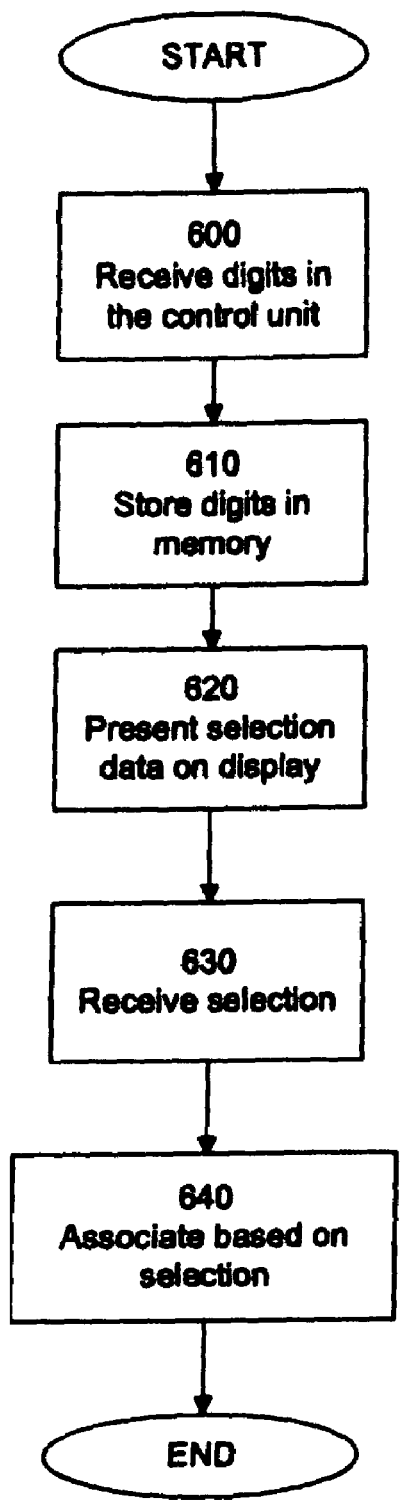
FIG. 6 is an illustration in more detail of a method for associating a telecommunication number with a specific dictionary according to yet another exemplary embodiment.

FIG. 6 is an illustration in more detail of a method for associating a telecommunication number with a specific dictionary according to yet another exemplary embodiment. Blocks 600 and 610 correspond to the blocks 300 and 310 disclosed above.

In block 620, the control unit 120 presents on the display in the mobile telecommunication terminal 100, data identifying at least one dictionary 152. The presentation may be in the form of a list of codes, such as, for example, SE for the Swedish dictionary, GB for the British dictionary etc.

In block 630, the control unit 120 receives a selection of at least one dictionary 152 from the list presented in block 620. The selection may be in the form of a press on a specified button on a keyboard in the input unit 140, a touch on the screen if touch sensitivity is provided for, a voice command, etc.

In block 640, the control unit associates the plurality of digits with dictionary selection data designating at least one dictionary based on said received selection.

Figure 7:
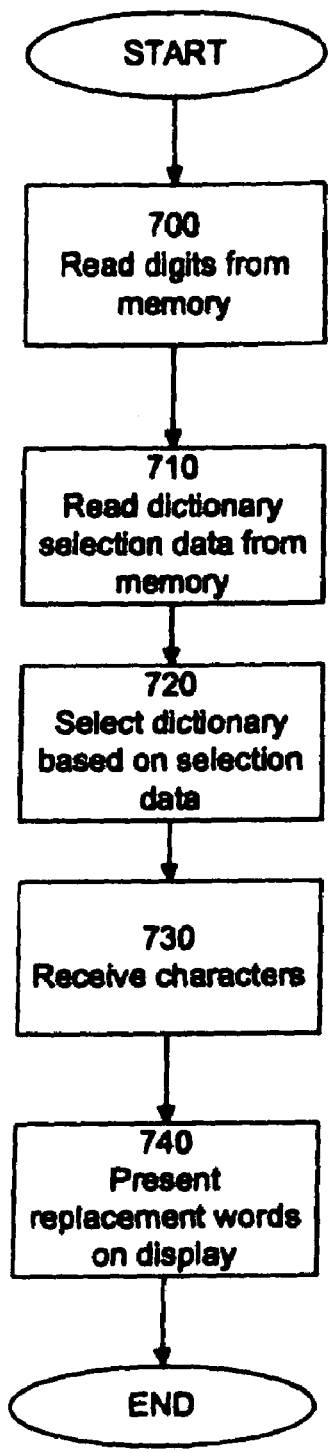
FIG. 7 is an illustration of a method for entering text in a mobile telecommunication terminal according to an exemplary embodiment.

FIG. 7 is an illustration of a method for entering text in a mobile telecommunication terminal according to one embodiment of the present invention.

In block 700, the control unit 120 reads a first set of digits from the phonebook 151 in the memory 150 in the mobile telecommunication terminal 100 or from a message that has previously been received in the mobile telecommunication terminal 100 from another terminal 105.

The digits correspond to a telecommunication number and identify a subscriber terminal in a telecommunication network. As disclosed above, the telecommunication number may be for example, a subscriber number used for establishing a communication with another user in the same telecommunications network as the mobile telecommunication terminal or an international telecommunication number comprising a country code. It is moreover appreciated that the telecommunication number may also comprise a national significant number if the current telecommunication network standard so requires.

In block 710, the control unit 120 reads first dictionary selection data from the memory 150. The dictionary selection data are associated with the first set of digits and designates at least one dictionary 152 stored in the memory 150. As disclosed above, the association may be in the form of a pointer or a reserved data field 255 in the phonebook 151.

In block 720, the control unit 120 selects the designated dictionary 152 stored in the memory 150 based on the first dictionary selection data. The selection may be in the form of loading the address of the start of the dictionary 152 in the control unit for sequential reading, loading the entire dictionary 152 from a nonvolatile memory (e.g. Flash Memory) into a RAM for quick access to the records, or in any other form in which the control unit 120 gains access to the words stored in the dictionary 152. It is appreciated that the selecting functionality provided by the control unit 120 may also be implemented by means of specific hardware, such as a Field Programmable Gate Array (FPGA), an Application specific Integrated Circuit. (ASIC), discrete logic etc.

In block 730, the control unit 120 receives one or more characters entered by means of the input unit 140. The characters are entered in the mobile telecommunication terminal 100 in order to form a text message for transmission to another terminal 105 in the telecommunication network.

In block 740, the control unit 120 uses the display 130 for presenting one or more words from the dictionary based on the characters received in block 730. The words presented on the display 130 may start with the same characters which are received in block 730 in order to make it possible for a user of the mobile telecommunication terminal 100 to indicate for example, by means of pressing a button on a keyboard in the input unit 140, which of the presented words is to be exchanged with the entered characters.

Figure 8:
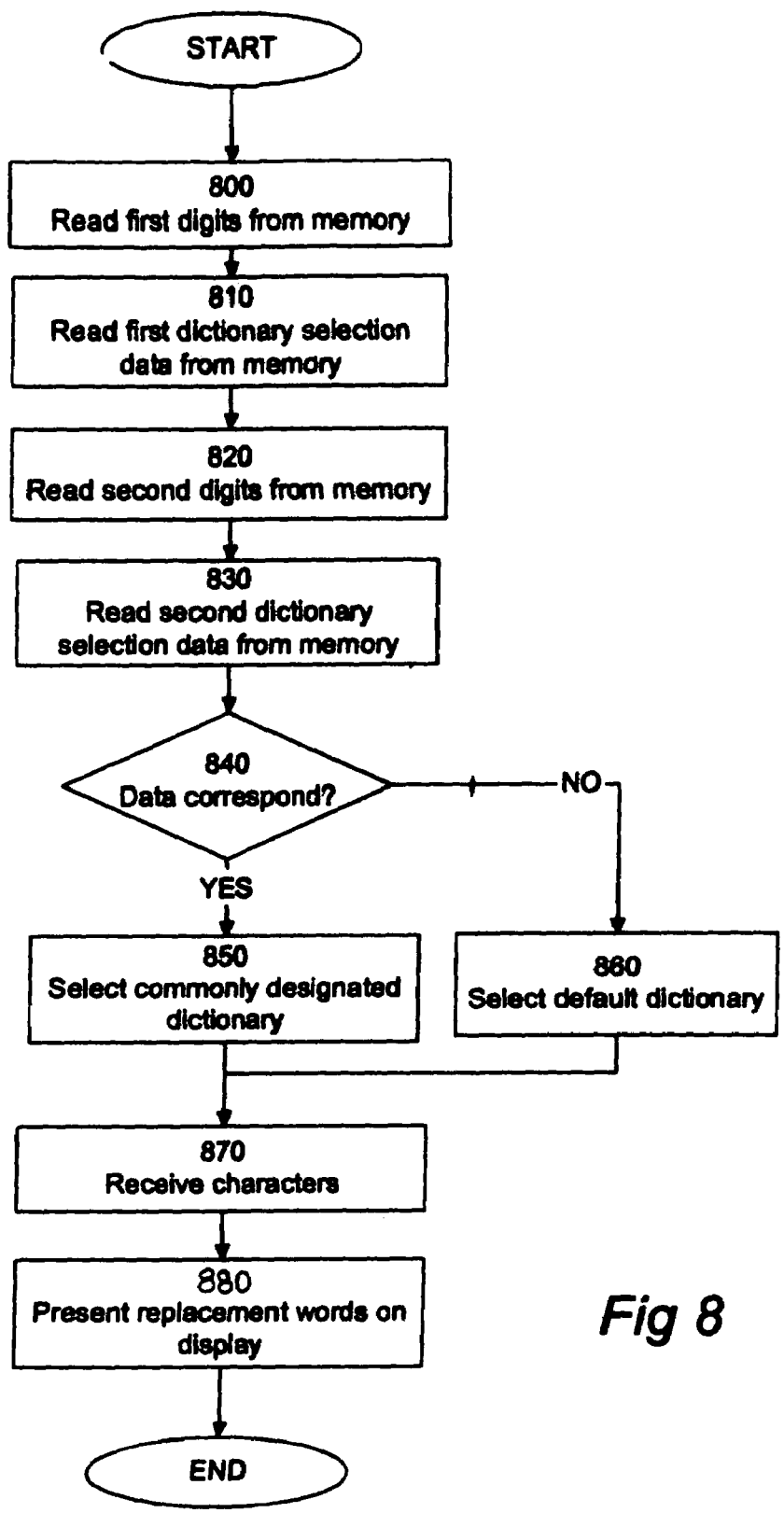
FIG. 8 is an illustration of a method for entering text in a mobile telecommunication terminal according to another exemplary embodiment.

FIG. 8 illustrates an alternative embodiment of a method for entering text in a mobile telecommunication terminal. Blocks 800 and 810 correspond to blocks 700 and 710 disclosed above.

However, in block 820, the control unit 120 reads a second set of digits from the phonebook 151 in the memory 150 in the mobile telecommunication terminal 100. The digits correspond to second telecommunication number and identify a second subscriber terminal in the telecommunication network.

In block 830, the control unit 120 reads the second dictionary selection data 255 from the memory 150. The second dictionary selection data 255 are associated with the second set of digits and designate at least one dictionary 152 stored in the memory 150.

In block 840, the control unit 120 determines if the first dictionary selection data 255 and the second dictionary selection data 255 correspond by comparing the first and second dictionary selection data 255. If the first dictionary selection data and the second dictionary selection data correspond, the routine jumps to block 850 wherein the control unit 120 selects the designated dictionary 152 stored in the memory 150 based on the corresponding first and second dictionary selection data 255.

However, if the first and second dictionary selection data 255 do not correspond, the routine jumps to block 860, wherein at least one default dictionary 152 stored in the memory 150 is selected.

The routine then continues with blocks 870 and 880, which correspond to blocks 730 and 740 disclosed above.

Figure 9:
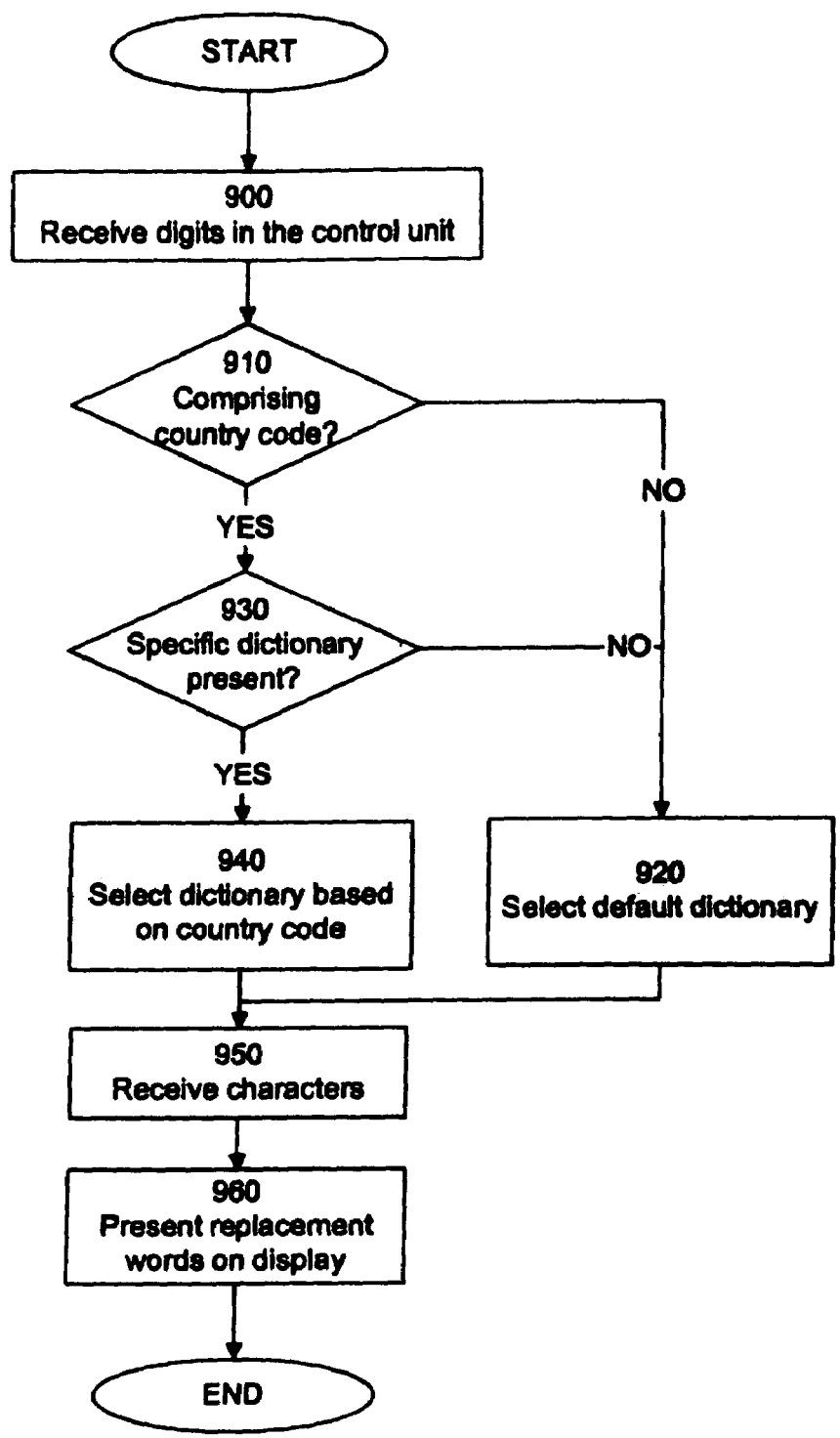
FIG. 9 is an illustration of a method for entering text in a mobile telecommunication terminal according to yet another exemplary embodiment.

FIG. 9 is an illustration of a method for entering text in a mobile telecommunication terminal according to another exemplary embodiment.

In block 900, the control unit 120 receives a plurality of digits. The digits identify a subscriber terminal in a telecommunication network. The digits may be received in the control unit 120 from a phonebook 151, from a previously received message from another terminal 105, or from the input unit 140.

In block 910, the control unit 120 determines if one or more of the digits entered by means of the input unit 140 or read out of the memory 150 correspond to a country code. A simple and straightforward method for determining if the digits comprise a country code is to compare the first digits in the received sequence of digits with the country codes 153 stored in the memory 150. More, complex schemes taking the structure of the entire sequence of digits into account are, however, equally possible.

If the digits do not comprise a country code, the control unit in block 920 selects a default dictionary in the memory 150, such as for example, an English dictionary.

However, if the plurality of digits comprise a country code, the control unit 120 in block 930 determines if a dictionary 152 in a language corresponding to the country code is present in the memory 150. That is, if the telecommunication number for example, comprises the country code 46, the control unit 120 determines if the memory 150 comprises a dictionary in Swedish. If not, the routine jumps to block 920, wherein the control unit 120 selects at least one default dictionary stored in the memory 150.

However, if the memory 150 comprises a dictionary in a language specified by the country code, the control unit 120 in block 940 selects at least one dictionary 152 which is in a language corresponding to the country code. As mentioned above, the control unit 120 may be adapted to use more than one dictionary 152 simultaneously. The dictionary selection data may designate for example, a Euro dictionary being a multi-designation of an English, a German and a French dictionary 152. Alternatively, the control unit 120 may use the display 130 for presenting data identifying one or more countries or languages corresponding to the country code. The user may then select the country or language, wherein the control unit 120 selects at least one dictionary 152, which is in a language corresponding to the country code.

The routine then continues with blocks 950 and 960, which correspond to blocks 730 and 740 disclosed above.

Figure 10:
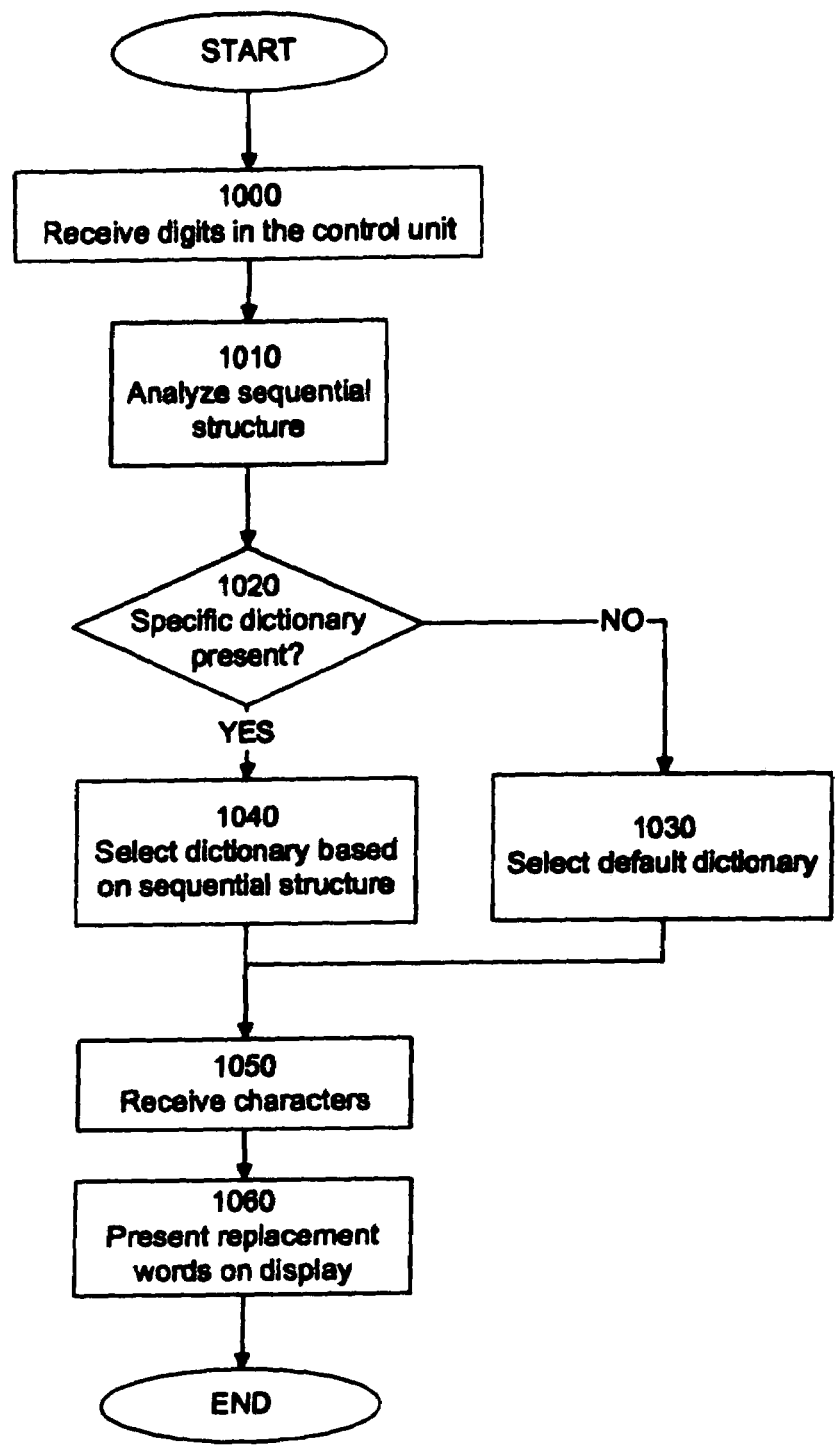
FIG. 10 is an illustration of a method for entering text in a mobile telecommunication terminal according to still another exemplary embodiment.

FIG. 10 is an illustration of a method for entering text in a mobile telecommunication terminal according to yet another exemplary embodiment.

In block 1000, the control unit 120 receives a plurality of digits. The digits identify a subscriber terminal in a telecommunication network. The digits may be received in the control unit 120 from a phonebook 151, from a previously received message from another terminal 105, or from the input unit 140.

In block 1010, the control unit 120 analyzes the sequential structure of the sequence of digits received in block 1040. The analysis may be based on the numbering structure found in ITIJ recommendation E.164 or any other suitable numbering structure. By comparing the sequential structure of the received digits with the different numbering structures found in different countries, the control unit 120 may determine in which country the plurality of digits relate to a subscriber number.

The control unit 120, in block 1020, determines if a dictionary 152 in a language corresponding to the country in which the plurality of digits relate to a subscriber number is present in the memory 150. For example, if the sequential structure of the telecommunication number points out Sweden, the control unit 120 determines if the memory 150 comprises a dictionary in Swedish.

If the memory 150 does not comprise a dictionary in a language specified by the sequential structure of the telecommunication number, the routine jumps to block 1030, wherein the control unit selects at least one default dictionary stored in the memory 150.

However, if the memory 150 comprises a dictionary in a language specified by the sequential structure of the telecommunication number, the control unit 120 in block 1040 selects at least one dictionary 152 stored in the memory, which dictionary 152 is in a language corresponding to the country in which the plurality of digits relate to a subscriber number. Alternatively, the control unit 120 may use the display 130 for presenting data identifying one or more countries in which the plurality of digits relates to a subscriber number. The user may then select a specific country whereupon the control unit 120 selects a dictionary 152 in a language corresponding to the country in which the plurality of digits relate to a subscriber number.

The routine then continues with blocks 1050 and 1060, which correspond to blocks 730 and 740 disclosed above.

Figure 11:
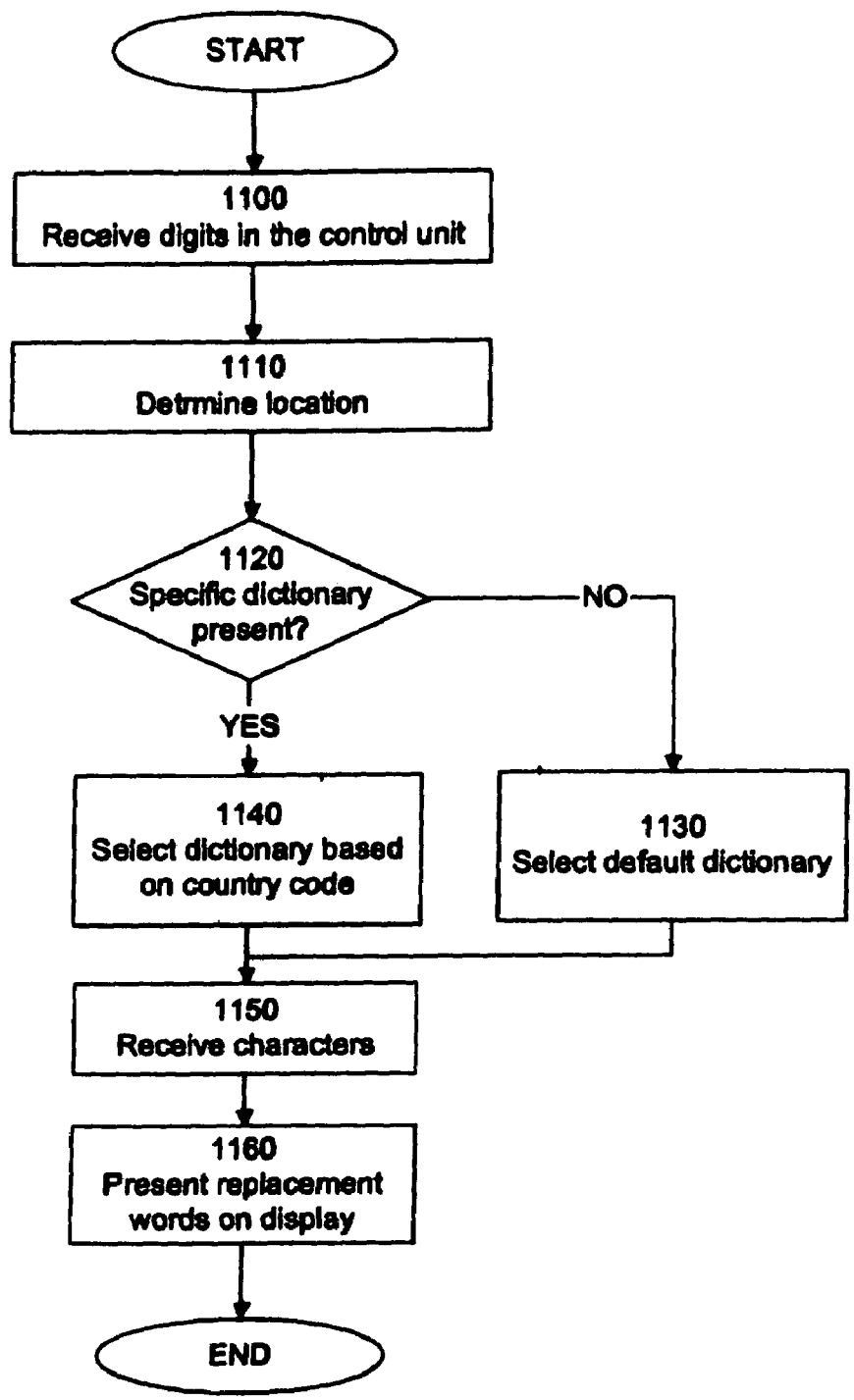
FIG. 11 is an illustration of a method for entering text in a mobile telecommunication terminal according to yet another exemplary embodiment.

FIG. 11 is an illustration of a method for entering text in a mobile telecommunication terminal according to yet another exemplary embodiment.

In block 1100, the user of the mobile telecommunication terminal 100 inputs a series of digits on the input unit 140 by for example, pressing the appropriate keys on a keyboard or selecting the digits by means of a navigation wheel and the display 130. Alternatively, the user selects digits in the form of a pre-stored telecommunication number from the phonebook 151 in the memory 150 or by inputting the number via a microphone for recognition by a text recognition functionality of the mobile telecommunication terminal 100.

In block 1110, the control unit 120 determines in which country the mobile telecommunication terminal 100 is located by receiving a network ID from the base station 102. For example, in case of GSM, the network ID comprises a mobile country code as defined in ITtI recommendation E.212, wherein the control unit 120 may determine in which country the mobile telecommunication terminal 100 is currently located directly from the information received. Alternatively, the control unit 120 may be coupled to a GPS receiver (not shown) and a GPS database (not shown), comprising country location information, in order to establish the current position of the mobile telecommunication terminal 100. The GPS database may directly provide the control unit 120 with a mobile country code corresponding to the current location of the mobile telecommunication terminal 100.

The control unit 120, in block 1120, determines if a dictionary 152 in a language corresponding to the country in which the mobile telecommunication terminal 100 is currently located is present in the memory 150. Alternatively, the control unit 120 may use the display 130 for presenting data identifying the country corresponding to the mobile country code received from the base station 102 or the GPS database 161. The user may then select a specific country whereupon the control unit 120 selects a dictionary 152 in a language corresponding to the country indicated by the location data. That is, if the current location is Sweden, the control unit 120 determines if the memory 150 comprises a dictionary in Swedish.

If the memory 150 does not comprise a dictionary corresponding to the country indicated by the location data, the routine jumps to block 1130, wherein the control unit 120 selects at least one default dictionary 152 stored in the memory 150.

However, if the memory 150 comprises a dictionary in a language specified by the current location data, the control unit 120 in block 1140 selects at least one dictionary 152 stored in the memory, which dictionary 152 is in a language corresponding to the country indicated by the location data. Alternatively, the control unit 120 may use the display 130 for presenting data identifying one or more dictionaries 152 corresponding to a language indicated by the location data. The user may then select a specific country whereupon the control unit 120 selects a dictionary 152 in a language corresponding to the country indicated by the location data.

The routine then continues with blocks 1050 and 1060, which correspond to blocks 730 and 740 disclosed above.

Figure 12:
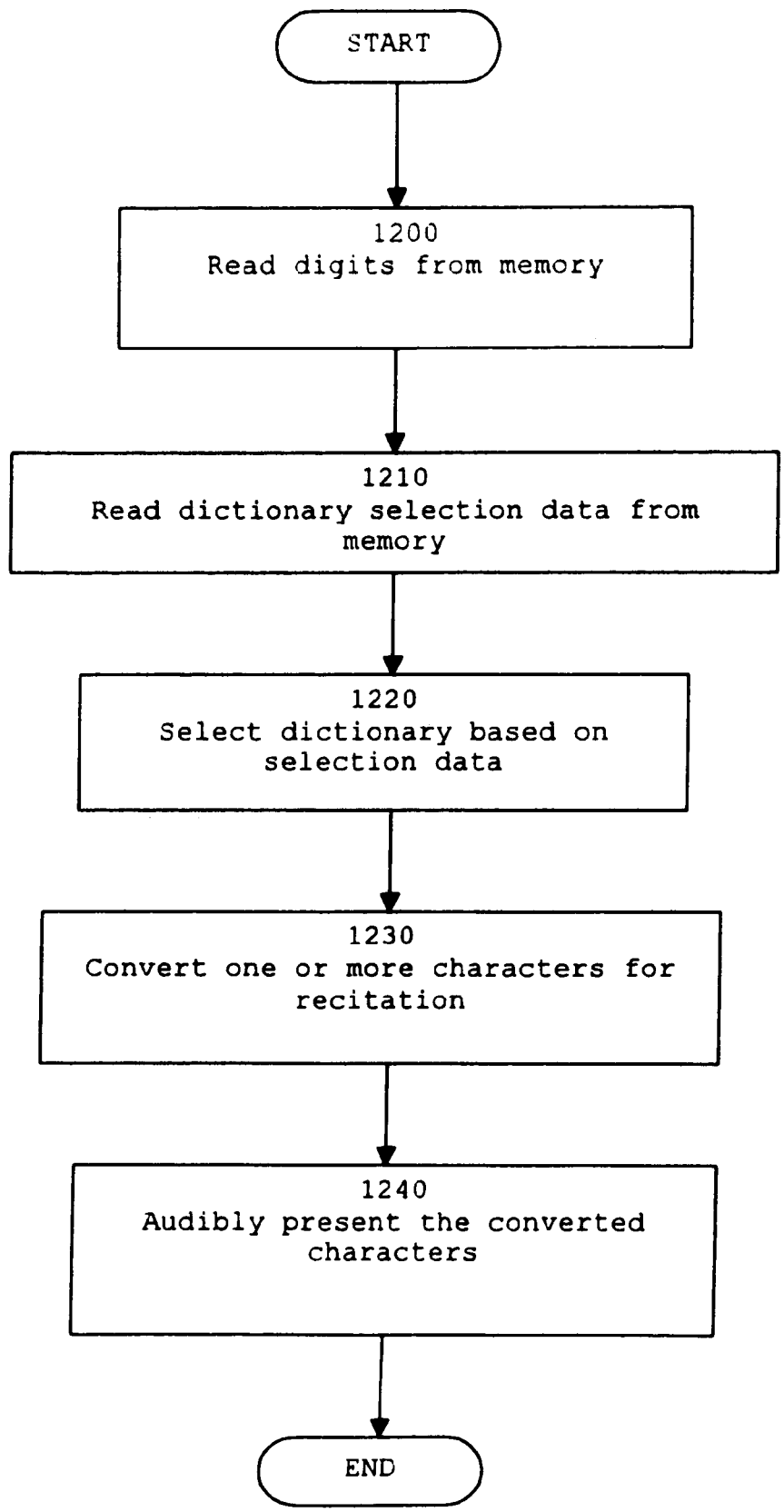
FIG. 12 is an illustration of a method for audibly playing text in a mobile telecommunication terminal according to an exemplary embodiment.

FIG. 12 is an illustration of a method for audibly presenting text in a mobile telecommunication terminal according to one embodiment of the present invention.

In block 1200, the control unit 120 reads a first set of digits from the phonebook 151 stored in the memory 150 of the mobile telecommunication terminal 100 or from a message that has previously been received in the mobile telecommunication terminal 100 from another terminal 105.

The digits correspond to a telecommunication number and identify a subscriber terminal in a telecommunication network. As disclosed above, the telecommunication number may be for example, a subscriber number used for establishing a communication with another user in the same telecommunications network as the mobile telecommunication terminal or an international telecommunication number comprising a country code. It is moreover appreciated that the telecommunication number may also comprise a national significant number if the current telecommunication network standard so requires.

In block 1210, the control unit 120 reads dictionary selection data from the memory 150. The dictionary selection data are associated with the first set of digits and designate at least one dictionary 152 stored in the memory 150. As disclosed above, the association may be in the form of a pointer or a reserved data field 255 in the phonebook 151.

In block 1220, the control unit 120 selects the designated dictionary 152 stored in the memory 150 based on the first dictionary selection data. The selection may be in the form of loading the address of the start of the dictionary 152 in the control unit for sequential reading, loading the entire dictionary 152 from a nonvolatile memory (e.g. Flash Memory) into a RAM for quick access to the records, or in any other form in which the control unit 120 gains access to the words stored in the dictionary 152. It is appreciated that the selecting functionality provided by the control unit 120 may also be implemented by means of specific hardware, such as a Field Programmable Gate Array (FPGA), an Application specific Integrated Circuit. (ASIC), discrete logic etc.

In block 1230, the control unit 120 via the text to speech algorithm (not shown) or any suitable circuitry within the mobile telecommunication terminal 100 converts one or more characters such as for example, a name prompt from the phonebook 151 or text from an outgoing message or a message received as a transmission from another terminal 105 in the telecommunication network, for recitation or audible presentation in accordance with the dictionary 152 selected by the control unit 120.

In block 1240, the control unit 120 uses a speaker 160 of the telecommunication terminal 100 for reciting or audibly presenting the one or more converted characters, such as a name from the phonebook 151 or one or more words from a text message, in accordance with the dictionary selected in block 1220. The control unit 1220 may use the text to speech algorithm (not shown) to simultaneously convert the one or more characters during audible presentation in accordance with the dictionary selected in block 1220 or the one or more characters may be converted prior to presentation.

Figure 13:
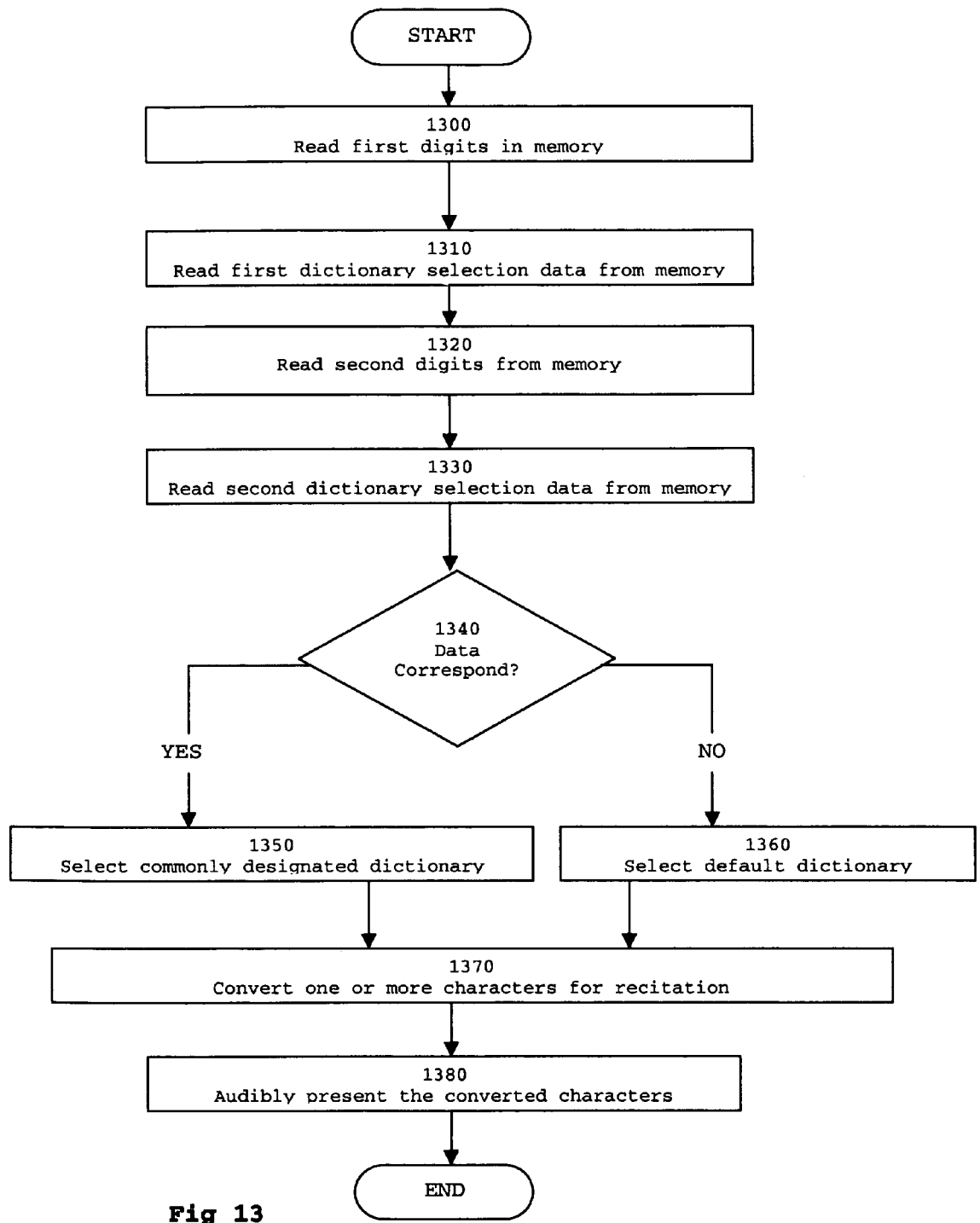
FIG. 13 is an illustration of a method for audibly playing text in a mobile telecommunication terminal according to another exemplary embodiment.

FIG. 13 illustrates an alternate embodiment of a method for audibly presenting text in a mobile telecommunication terminal. Blocks 1300 and 1310 correspond to blocks 1200 and 1210 disclosed above.

However, in block 1320, the control unit 120 reads a second set of digits from the phonebook 151 in the memory 150 in the mobile telecommunication terminal 100. The digits correspond to second telecommunication number and identify a second subscriber terminal in the telecommunication network.

In block 1330, the control unit 120 reads second dictionary selection data 255 from the memory 150. The second dictionary selection data 255 are associated with the second set of digits and designate at least one dictionary 152 stored in the memory 150.

In block 1340, the control unit 120 determines if the first dictionary selection data 255 and the second dictionary selection data 255 correspond by comparing the first and second dictionary selection data 255. If the first dictionary selection data and the second dictionary selection data correspond, the routine jumps to block 1350 wherein the control unit 120 selects a second designated dictionary 152 stored in the memory 150 based on the corresponding dictionary selection data 255. The second designated dictionary replaces the dictionary selected in Block 1220 shown in FIG. 12.

However, if the first and second dictionary selection data 255 do not correspond, the routine jumps to block 1360, wherein at least one default dictionary 152 stored in the memory 150 is selected.

The routine then continues with blocks 1370 and 1380, which correspond to blocks 1230 and 1240 disclosed above.

Figure 14:
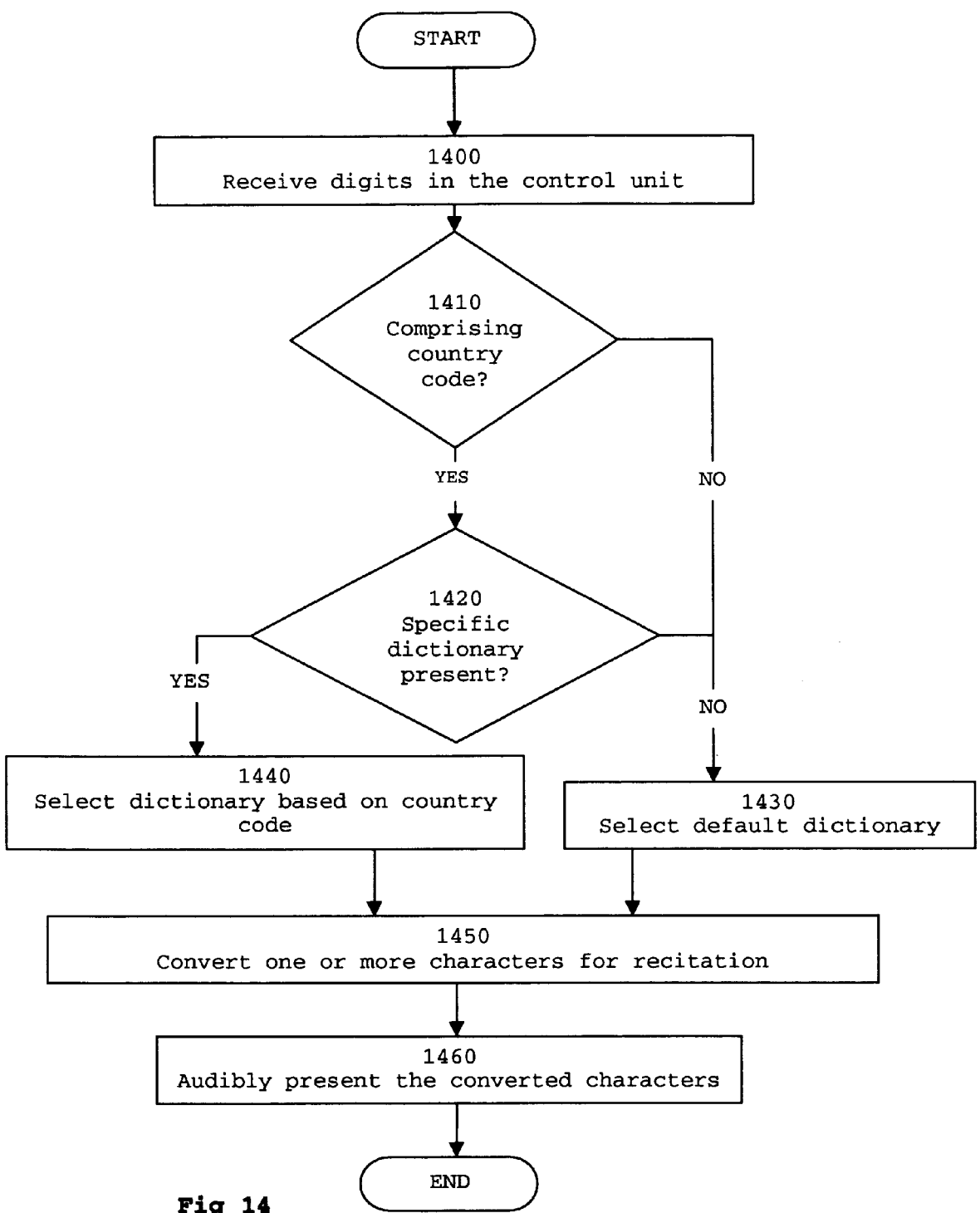
FIG. 14 is an illustration of a method for audibly playing text in a mobile telecommunication terminal according to yet another exemplary embodiment.

FIG. 14 is an illustration of a method for audibly presenting text in a mobile telecommunication terminal according to another exemplary embodiment.

In block 1400, the control unit 120 receives a plurality of digits. The digits may identify a subscriber terminal in a telecommunication network. The digits may be received in the control unit 120 from a phonebook 151, from a previously received message from another terminal 105, or from the input unit 140.

In block 1410, the control unit 120 determines if one or more of the digits entered by means of the input unit 140 or read out of the memory 150 correspond to a country code. A simple and straightforward method for determining if the digits comprise a country code is to compare the first digits in the received sequence of digits with the country codes 153 stored in the memory 150. More complex schemes taking the structure of the entire sequence of digits into account are, however, equally possible.

If the digits do not comprise a country code, the control unit in block 1420 selects a default dictionary, such as for example, an English dictionary, in the memory 150.

However, if the plurality of digits comprise a country code, the control unit 120 in block 1430 determines if a dictionary 152 in a language corresponding to the country code is present in the memory 150. That is, if the telecommunication number for example, comprises the country code 46, the control unit 120 determines if the memory 150 comprises a dictionary in Swedish. If not, the routine jumps to block 1420, wherein the control unit 120 selects at least one default dictionary stored in the memory 150.

However, if the memory 150 comprises a dictionary in a language specified by the country code, the control unit 120 in block 1440 selects at least one dictionary 152 which is in a language corresponding to the country code. As mentioned above, the control unit 120 may be adapted to use more than one dictionary 152 simultaneously. The dictionary selection data may designate for example, a Euro dictionary that may be a multi-designation of an English, a German and a French dictionary 152. Alternatively, the control unit 120 may use the display 130 for presenting data identifying one or more countries or languages corresponding to the country code. The user may then select the country or language, wherein the control unit 120 selects at least one dictionary 152, which is in a language corresponding to the country code.

The routine then continues with blocks 1450 and 1460, which correspond to blocks 1230 and 1240 disclosed above.

Figure 15:
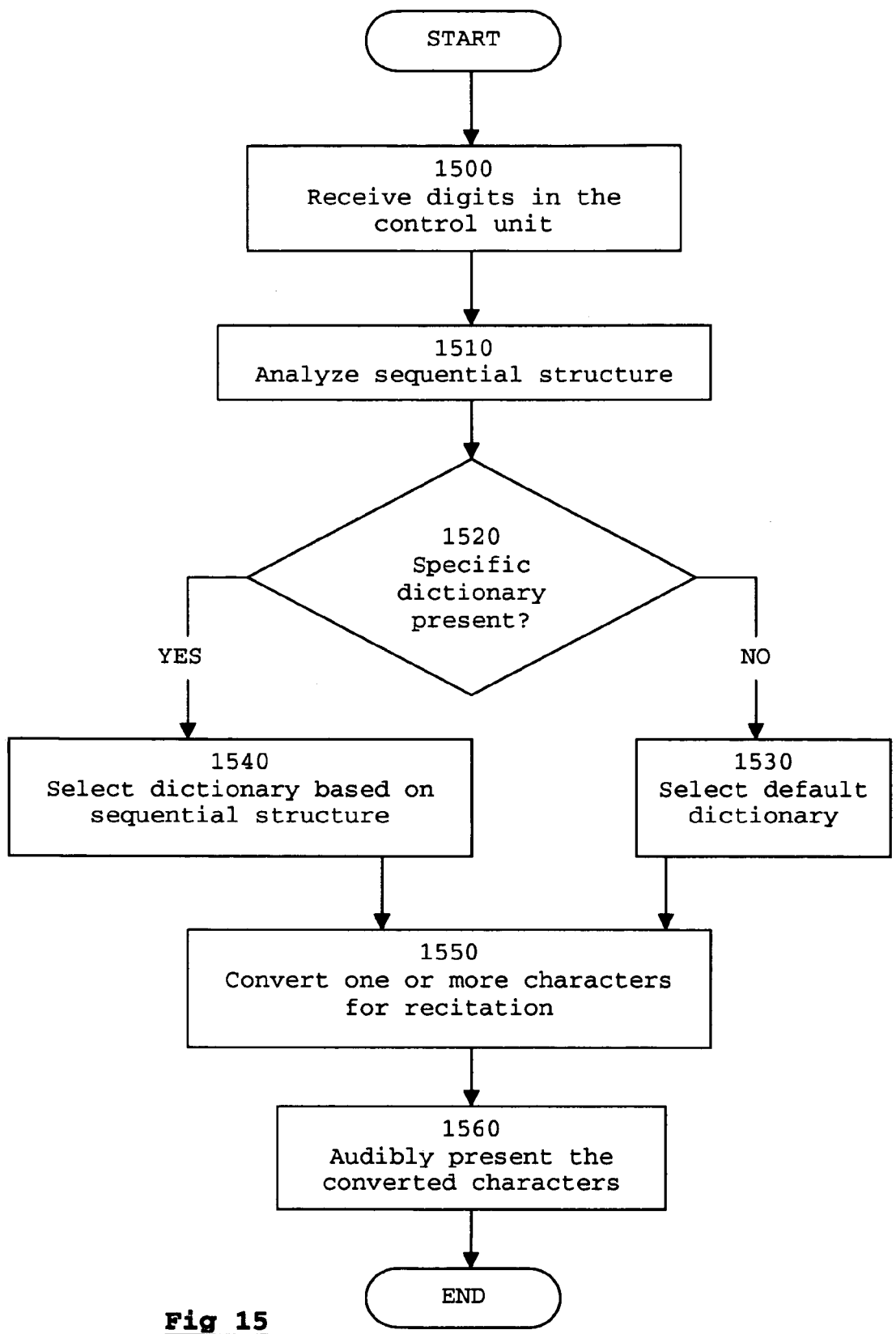
FIG. 15 is an illustration of a method for audibly playing text in a mobile telecommunication terminal according to yet another exemplary embodiment.

FIG. 15 is an illustration of a method for audibly presenting text in a mobile telecommunication terminal according to yet another exemplary embodiment.

In block 1500, the control unit 120 receives a plurality of digits. The digits may identify a subscriber terminal in a telecommunication network. The digits may be received in the control unit 120 from a phonebook 151, from a previously received message from another terminal 105, or from the input unit 140.

In block 1510, the control unit 120 analyzes the sequential structure of the sequence of digits received in block 1040. The analysis may be based on the numbering structure found in ITIJ recommendation E.164 or any other suitable numbering structure. By comparing the sequential structure of the received digits with the different numbering structures found in different countries, the control unit 120 may determine in which country the plurality of digits relate to a subscriber number.

The control unit 120 in block 1520 determines if a dictionary 152 in a language corresponding to the country in which the plurality of digits relates to a subscriber number is present in the memory 150. That is, if sequential structure of the telecommunication number points out Sweden, the control unit 120 determines if the memory 150 comprises a dictionary in Swedish.

If the memory 150 does not comprise a dictionary in a language corresponding to the country in which the plurality of digits relates, the routine jumps to block 1530, wherein the control unit selects at least one default dictionary stored in the memory 150.

However, if the memory 150 comprises a dictionary in a language specified by the sequential structure of the telecommunication number, the control unit 120 in block 1540 selects at least one dictionary 152 stored in the memory, which dictionary 152 is in a language corresponding to the country in which the plurality of digits relate to a subscriber number. Alternatively, the control unit 120 may use the display 130 for presenting data identifying one or more countries in which the plurality of digits relates to a subscriber number. The user may then select a specific country whereupon the control unit 120 selects a dictionary 152 in a language corresponding to the country in which the plurality of digits relate to a subscriber number.

The routine then continues with blocks 1550 and 1560, which correspond to blocks 1230 and 1240 disclosed above.

Figure 16:
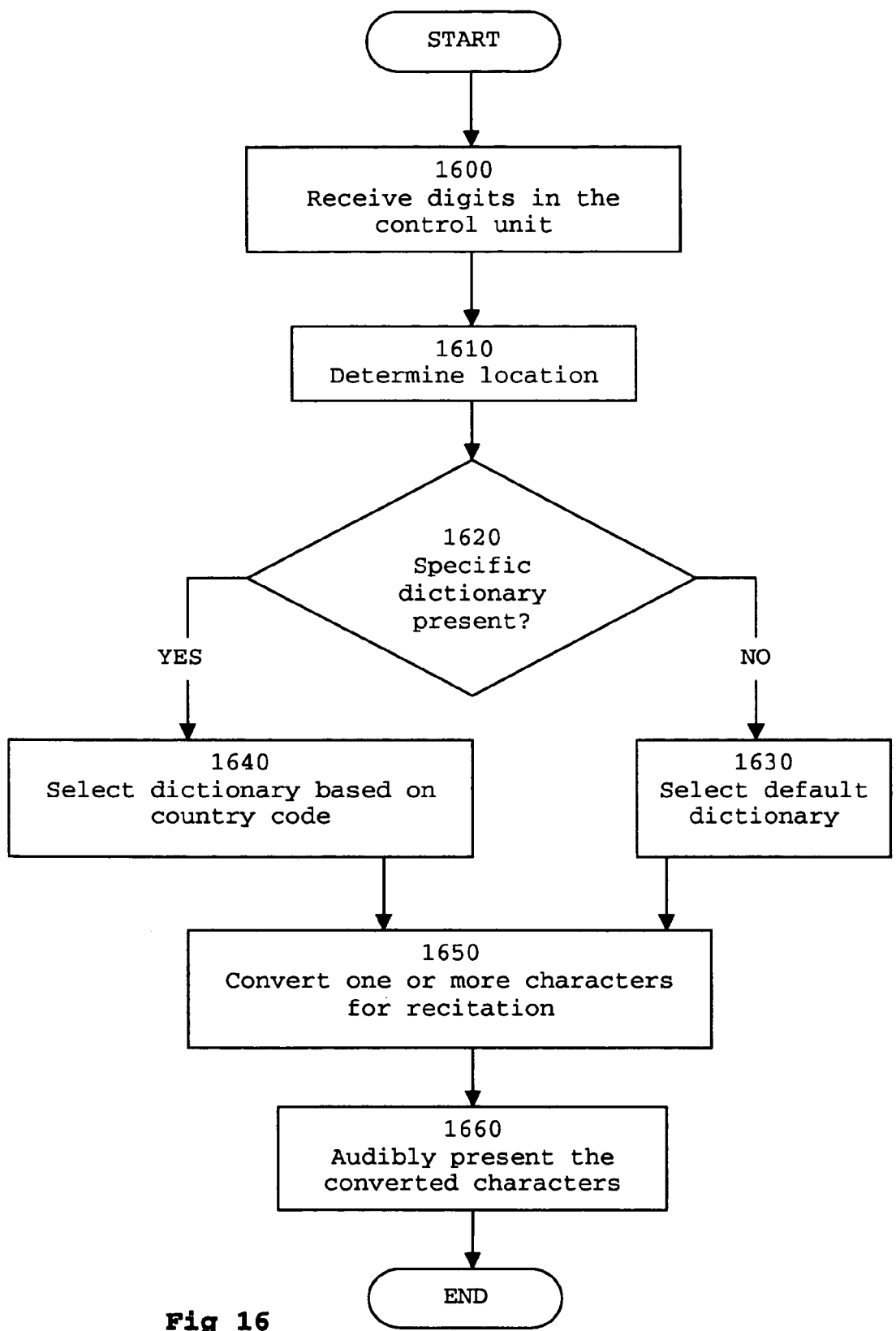
FIG. 16 is an illustration of a method for audibly playing text in a mobile telecommunication terminal according to yet another exemplary embodiment.

FIG. 16 is an illustration of a method for audibly presenting text in a mobile telecommunication terminal according to yet another exemplary embodiment.

In block 1600, the user of the mobile telecommunication terminal 100 inputs a series of digits on the input unit 140 by for example, pressing the appropriate keys on a keyboard or selecting the digits by means of a navigation wheel and the display 130. Alternatively, the user selects digits in the form of a pre-stored telecommunication number from the phonebook 151 in the memory 150. In alternate embodiments the digits may be entered via a microphone using a speech recognition functionality of the mobile telecommunication terminal 100.

In block 1610, the control unit 120 determines in which country the mobile telecommunication terminal 100 is located by receiving a network ID from the base station 102. For example, in the case of a GSM network, the network ID may comprise a mobile country code as defined in ITtI recommendation E.212, wherein the control unit 120 may determine in which country the mobile telecommunication terminal 100 is currently located directly from the information received. Alternatively, the control unit 120 may be coupled to a GPS receiver (not shown) and a GPS database (not shown), comprising country location information, in order to establish the current position of the mobile telecommunication terminal 100. The GPS database may directly provide the control unit 120 with a mobile country code corresponding to the current location of the mobile telecommunication terminal 100.

The control unit 120, in block 1620, determines if a dictionary 152 in a language corresponding to the country in which the mobile telecommunication terminal is currently located is present in the memory 150. Alternatively, the control unit 120 may use the display 130 for presenting data identifying the country corresponding to the mobile country code received from the base station 102 or the GPS database 161. The user may then select a specific country whereupon the control unit 120 selects a dictionary 152 in a language corresponding to the country indicated by the location data. That is, if the current location is Sweden, the control unit 120 determines if the memory 150 comprises a dictionary in Swedish.

If the memory 150 does not comprise a dictionary corresponding to the country indicated by the location data, the routine jumps to block 1630, wherein the control unit 120 selects at least one default dictionary 152 stored in the memory 150.

However, if the memory 150 comprises a dictionary in a language specified by the current location data, the control unit 120 in block 1640 selects at least one dictionary 152 stored in the memory, which dictionary 152 is in a language corresponding to the country indicated by the location data. Alternatively, the control unit 120 may use the display 130 for presenting data identifying one or more dictionaries 152 corresponding to a language indicated by the location data. The user may then select a specific country whereupon the control unit 120 selects a dictionary 152 in a language corresponding to the country indicated by the location data.

The routine then continues with blocks 1650 and 1660, which correspond to blocks 1230 and 1240 disclosed above.

Figure 17:
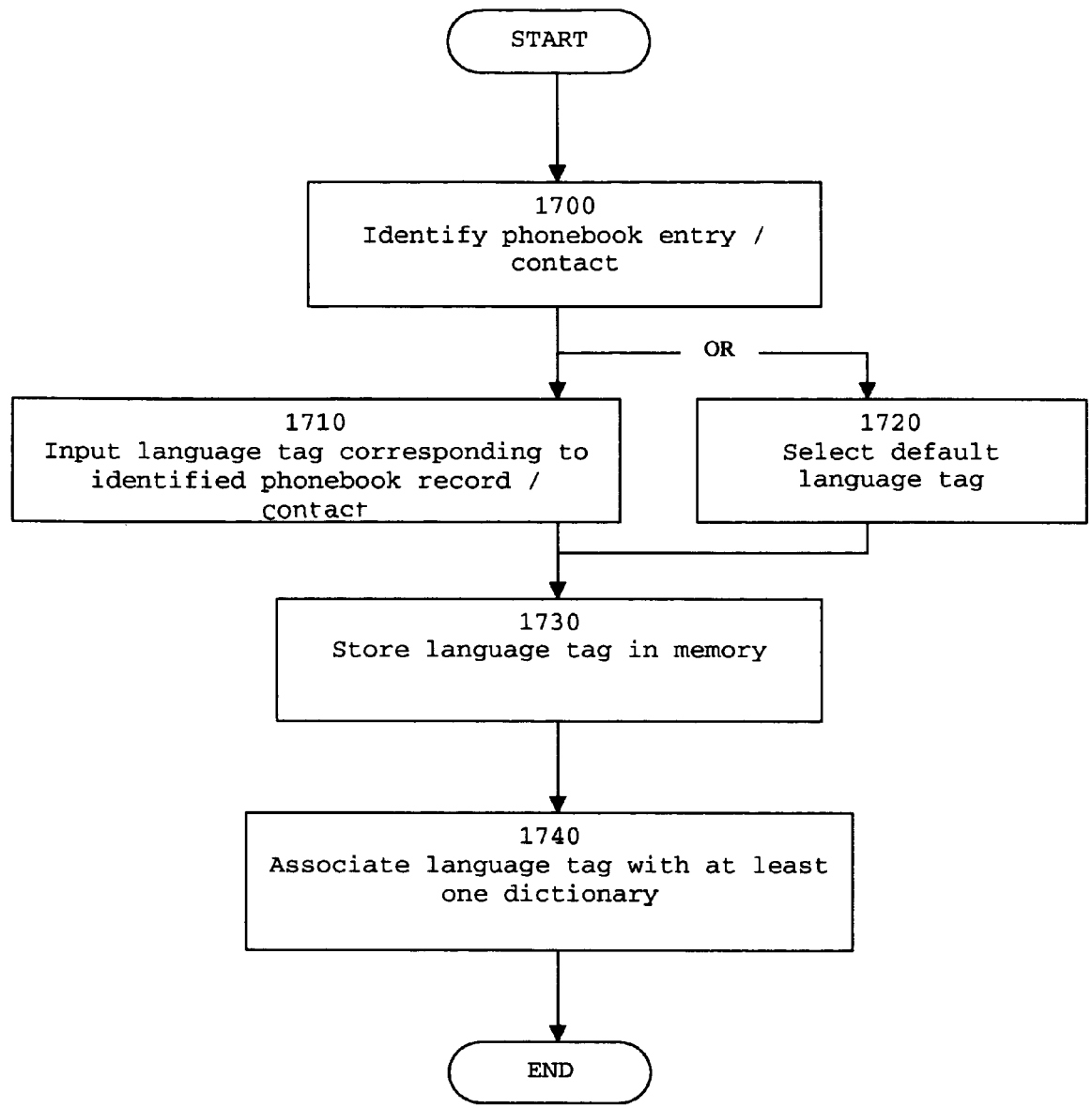
FIG. 17 is a schematic graph illustrating a method for organizing data records in a memory in a mobile telecommunication terminal according to an exemplary embodiment.

FIG. 17 is an illustration of one embodiment of a method for organizing data records in a memory 150 in a mobile telecommunication terminal 100.

In this embodiment, the user identifies a phonebook record 253 in block 1700, either by inputting a new contact or phonebook record 253 or by selecting an existing contact or phonebook record 253. In either case, the user may input or select an existing phonebook record 253 in any suitable manner such as for example, by pressing the appropriate keys on a keyboard or selecting the record by means of a navigation wheel and the display 130. In alternate embodiments, the user may input or select an existing phonebook record 253 via voice commands through a microphone (not shown) and a voice user interface.

The user may, in block 1710, input a language tag 256 in a predetermined area of the phonebook record 253. The language tag 256 may be entered in a substantially similar manner as described above for the selection of the phonebook record 253. In alternate embodiments and as shown in block 1220, if the user does not input the language tag, the control unit 120 may select a default language tag such as for example, a language tag corresponding to the default language of the user interface for the mobile telecommunication terminal 100 or the user's spoken language.

In block 1730, the user may instruct the control unit 120 to store the language tag 256 corresponding to the phonebook record 253 in the memory 150 of the mobile telecommunication terminal 100.

In block 1740, the control unit 120 associates the language tag 256 with at least one dictionary 152 stored in the memory 150. The control unit 120 may be adapted to use more than one dictionary 152 simultaneously. For example, the language tag 256 may designate a Euro dictionary that may be a multi-designation of an English, a German and a French dictionary 152. The association may be stored in a data field 256 in the same record 253 in the phonebook 251 or as a pointer which links the language tag 256 designating a specific dictionary 152 stored in the memory 150 to the telecommunication number 254. It is appreciated that the associating functionality provided by the control unit 120 may also be implemented by means of specific hardware, such as a Field Programmable Gate Array (FPGA), an Application specific Integrated Circuit (ASIC), discrete logic etc.

Figure 18:
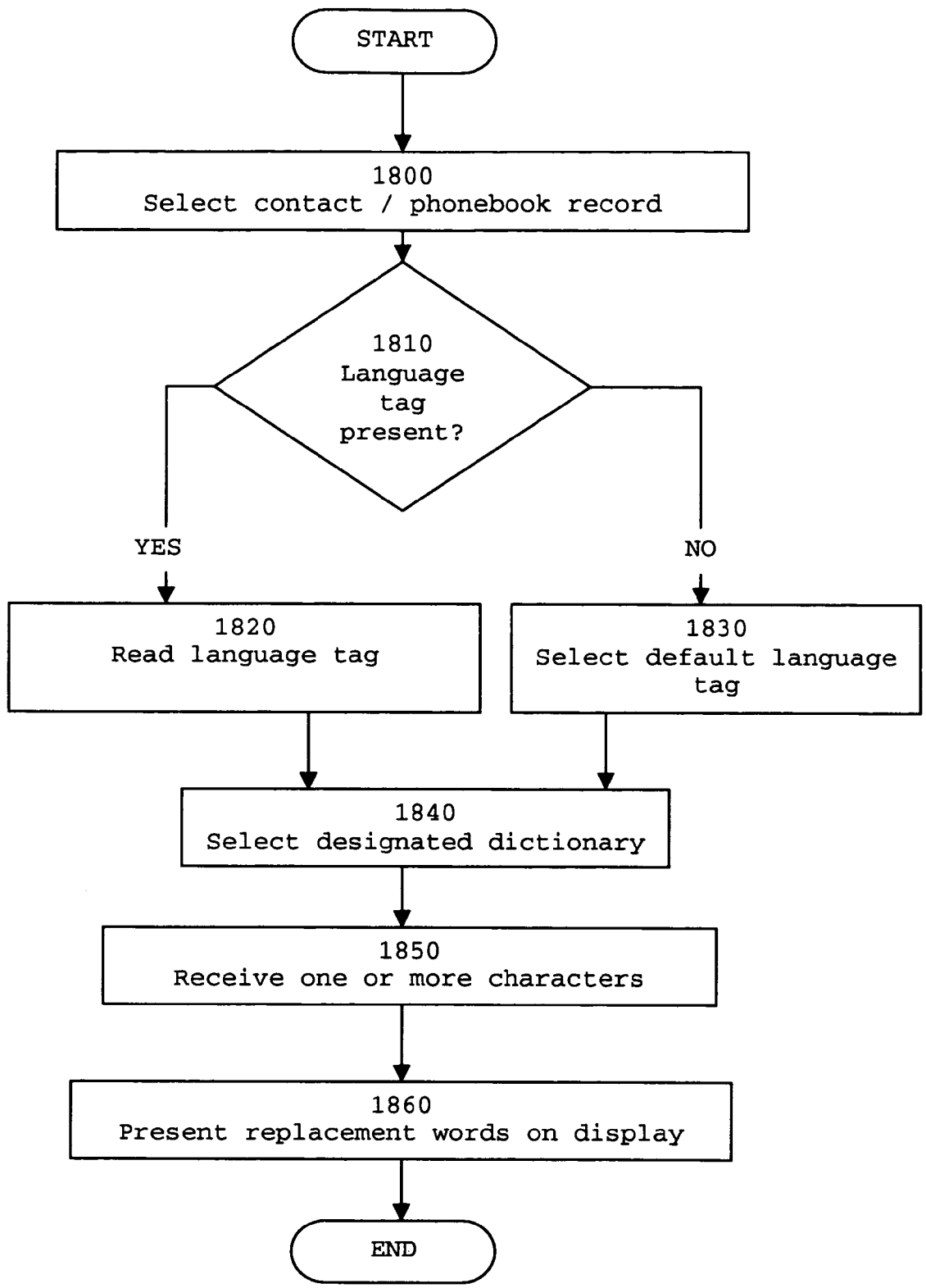
FIG. 18 is an illustration of a method for entering text in a mobile telecommunication terminal according to an exemplary embodiment.

FIG. 18 is an illustration of a method for inputting text in a mobile telecommunication terminal according to one embodiment of the present invention.

In block 1800, the user selects a contact or phone book record 253 from the phonebook 251 in the memory 150 of the mobile telecommunication terminal 100. In alternate embodiments, the user may select, or the record comprises a message that is or was received in the mobile telecommunication terminal 100 from another terminal 105 to which the user desires to make a reply.

In block 1810, the control unit 120 determines if a language tag 256 is present in the contact or phonebook record 253.

In block 1820, if a language tag 256 is present in the contact or phonebook record 253, the control unit 120 reads the language tag 256. The language tag 256 designates at least one dictionary 152 stored in the memory 150 to be associated with the contact. As disclosed above, the association may be in the form of a pointer or a reserved data field 255 in the phonebook 151.

In block 1830, if the user did not associate a language tag 256 with the contact or phonebook record 253, the control unit 120 may select a default language tag and designate a corresponding dictionary 152. The default language tag may correspond to the default language of the user interface for the mobile telecommunication terminal 100 or the user's spoken language.

In block 1840, the control unit 120 selects the designated dictionary 152 stored in the memory 150 based on the language tag 256 input by the user or the default language tag 256. The selection may be in the form of loading the address of the start of the dictionary 152 in the control unit for sequential reading, loading the entire dictionary 152 from a nonvolatile memory (e.g. Flash Memory) into a RAM for quick access to the records, or in any other form in which the control unit 120 gains access to the words stored in the dictionary 152. In alternate embodiments the selecting functionality provided by the control unit 120 may also be implemented in any suitable manner, such as for example, a Field Programmable Gate Array (FPGA), an Application specific Integrated Circuit. (ASIC), discrete logic etc.

In block 1850, the control unit 120 receives a code or one or more characters entered by means of the input unit 140. The characters are entered in the mobile telecommunication terminal 100 in order to form a text message for transmission to for example, another terminal 105.

In block 1860, the control unit 120 uses the display 130 for presenting one or more words from the dictionary based on the characters received in block 730. The words presented on the display 130 may start with the same characters which are received in block 730 in order to make it possible for a user of the mobile telecommunication terminal 100 to indicate for example, by means of pressing a button on a keyboard in the input unit 140, which of the presented words is to be exchanged with the entered characters.

Figure 19:
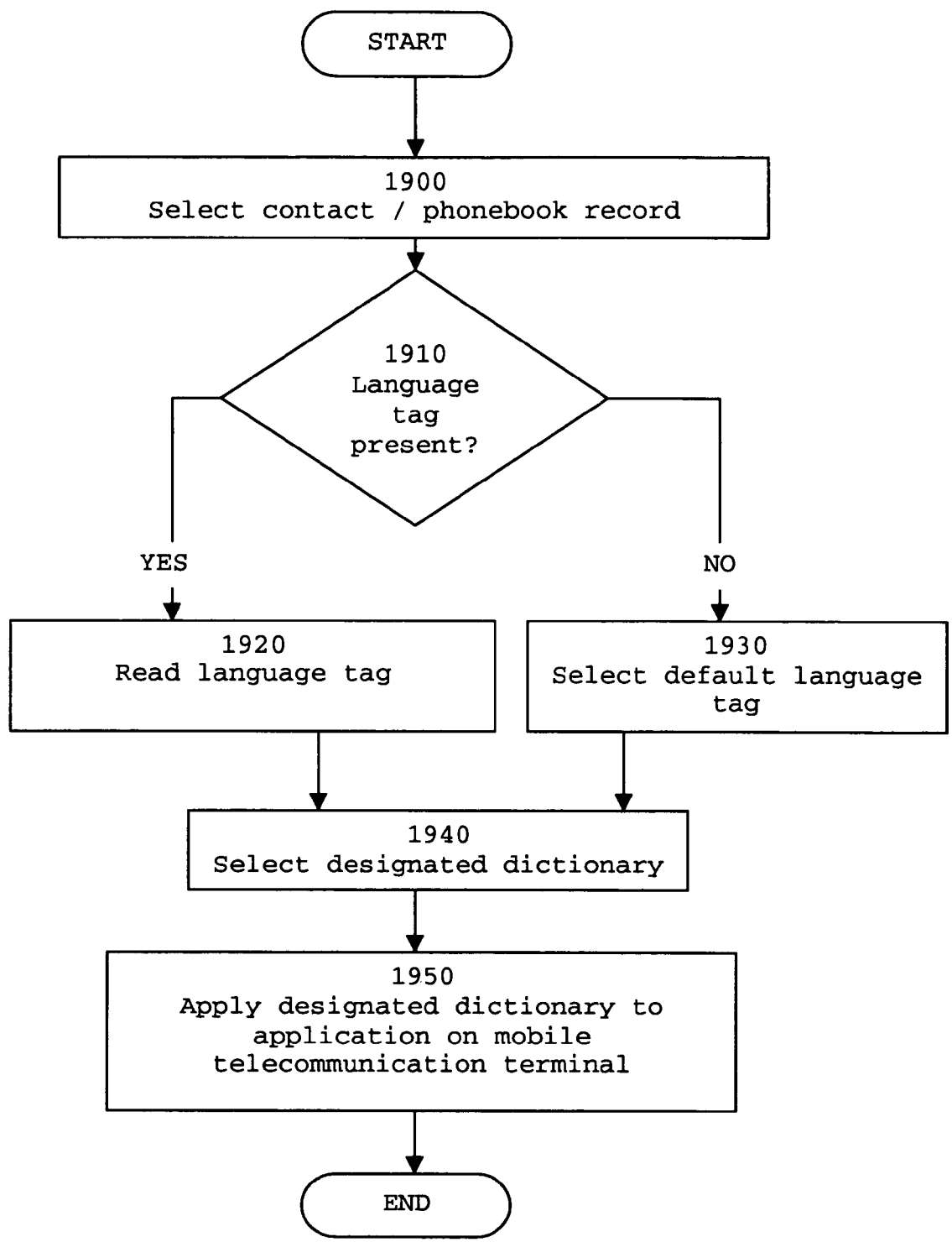
FIG. 19 is an illustration of a method for selecting a dictionary according to an exemplary embodiment.

FIG. 19 is an illustration of a method for automatically selecting a language in a mobile telecommunication terminal according to one embodiment of the present invention.

In block 1900, the user selects a contact or phone book record 253 in the memory 150 of the mobile telecommunication terminal 100. The user may select the phone book record using the input 140 of the mobile telecommunication terminal 100 in a manner substantially similar to that described above.

In block 1910, the control unit determines if there is a language tag 256 associated with the selected contact or phonebook record 253.

In block 1920, the control unit 120 reads a language tag 256 associated with the phone book record 253. As discussed above, the language tag 256 may designate at least one dictionary 152 stored in the memory 150.

In block 1930, if there is no language tag 256 designated in the phonebook record 253, the control unit 120 may select a default language tag and designate a dictionary corresponding to the default language tag. For example, the control unit may select a dictionary corresponding to the default language of the mobile telecommunication terminal 100 or the language of the user.

In block 1940, the control unit 120 selects the designated dictionary 152 based on the language tag 256.

In block 1950, the control unit 120 applies the designated dictionary 152 to any suitable application on the mobile telecommunication terminal 100. For example, the control unit may apply the designated dictionary 152 to a TTS functionality, a text recognition functionality or an in-device answering machine of the mobile telecommunication terminal 100. In the context of a TTS functionality, the designated dictionary 152 may be used, for example, in conjunction with a text to speech algorithm (not shown) stored in the memory 150 or any suitable circuitry within the mobile telecommunication terminal 100 for converting one or more characters such as for example, a name prompt from the phonebook 151 or text from a message received as a transmission from another terminal 105 in the telecommunication network. The name prompt or text may be recited or audibly presented through speaker 160 in a language that corresponds to the designated dictionary 152.

While the present invention has been particularly shown and described with reference to specific embodiments thereof, it will be understood by those skilled in the art that various changes in form and detail may be made thereto and that other embodiments of the present invention beyond embodiments specifically described herein may be made or practiced without departing from the spirit and scope of the present invention as limited solely by the appended claims.

What is claimed is:

1. A method for audibly presenting text associated with a message in a mobile telecommunication terminal comprising;
   reading a first set of digits from a memory in the mobile telecommunication terminal, the first set of digits identifying a subscriber terminal in a telecommunication network;
   automatically selecting a first at least one dictionary associated with the first set of digits, where selecting the first at least one dictionary includes,
   at least one of loading the address of a start of the first at least one dictionary for sequential reading and loading an entirety of the first at least one dictionary into a random access memory of the mobile telecommunication terminal,
   reading dictionary selection data from a data record associated with the first set of digits and designating at least one dictionary stored in the memory, and
   selecting the at least one designated dictionary based on the dictionary selection data;
   determining if the first set of digits comprise a country code; and
   automatically selecting at least one dictionary that corresponds to a language associated with the country code;
   receiving at least one character associated with a data record or an incoming or outgoing message;
   audibly presenting the at least one character in a language associated with the dictionary;
   automatically forming at least one word from the at least one character and audibly presenting the at least one word;
   reading a second set of digits from the memory in the mobile telecommunication terminal, the second set of digits identifying a second subscriber terminal in a telecommunication network;
   reading second dictionary selection data from the memory, the second dictionary selection data being associated with the second set of digits and designating at least one dictionary stored in the memory;
   determining if the first dictionary data and the second dictionary data correspond; and
   if the first dictionary selection data and the second dictionary selection data correspond, selecting a second at least one dictionary stored in the memory based on the corresponding dictionary selection data, the second at least one dictionary replacing the first at least one dictionary.

2. The method according to claim 1, wherein at least one default dictionary stored in the memory is selected if the first and second dictionary selection data do not correspond.

3. The method of claim 1, wherein selecting the at least one dictionary comprises:
   determining, from a sequential structure of the plurality of digits, a country associated with the subscriber number; and
   selecting at least one dictionary stored in the memory, the at least one dictionary being in a language corresponding to the country.

4. An apparatus comprising:
   a speaker;
   an input module; and
   a control unit connected to the speaker and input module, the control unit being configured to:
      read a first set of digits from a memory in the apparatus, the first set of digits identifying a subscriber terminal in a telecommunication network;
      automatically select a first at least one dictionary associated with the first set of digits, where selecting the first at least one dictionary includes,
         at least one of loading the address of a start of the first at least one dictionary for sequential reading and loading an entirety of the first at least one dictionary into a random access memory of the apparatus;
         reading dictionary selection data from a data record associated with the first set of digits and designating at least one dictionary stored in the memory; and
         selecting the at least one designated dictionary based on the dictionary selection data;
         determining if the first set of digits comprise a country code; and
         automatically selecting at least one dictionary that corresponds to a language associated with the country code;
      receive at least one character associated with a data record or an incoming or outgoing message;
      audibly present the at least one character in a language associated with the dictionary;

automatically form at least one word from the at least one character and audibly present the at least one word;
read a second set of digits from the memory in the apparatus, the second set of digits identifying a second subscriber terminal in a telecommunication network;
read second dictionary selection data from the memory, the second dictionary selection data being associated with the second set of digits and designating at least one dictionary stored in the memory;
determine if the first dictionary data and the second dictionary data correspond; and
if the first dictionary selection data and the second dictionary selection data correspond, select a second at least one dictionary stored in the memory based on the corresponding dictionary selection data, the second at least one dictionary replacing the first at least one dictionary.

5. The apparatus according to claim 4, wherein at least one default dictionary stored in the memory is selected if the first and second dictionary selection data do not correspond.

6. The apparatus according to claim 4, wherein the apparatus is a mobile telecommunication terminal.

7. The apparatus according to claim 4, wherein selecting the at least one dictionary comprises:
determining, from a sequential structure of the plurality of digits, a country associated with the subscriber number; and
selecting at least one dictionary stored in the memory, the at least one dictionary being in a language corresponding to the country.

8. A computer program product embodied in a memory of a device comprising:
computer readable program code embodied in a computer readable medium for executing a method for audibly presenting text associated with a message in a mobile telecommunication terminal comprising:
reading a first set of digits from a memory in the mobile telecommunication terminal, the first set of digits identifying a subscriber terminal in a telecommunication network;
automatically selecting a first at least one dictionary associated with the first set of digits, where selecting the first at least one dictionary includes,
at least one of loading the address of a start of the first at least one dictionary for sequential reading and loading an entirety of the first at least one dictionary into a random access memory of the mobile telecommunication terminal,
reading dictionary selection data from a data record associated with the first set of digits and designating at least one dictionary stored in the memory, and
selecting the at least one designated dictionary based on the dictionary selection data;
determining if the first set of digits comprise a country code; and
automatically selecting at least one dictionary that corresponds to a language associated with the country code;
receiving at least one character associated with a data record or an incoming or outgoing message;
audibly presenting the at least one character in a language associated with the dictionary;
automatically forming at least one word from the at least one character and audibly presenting the at least one word;
reading a second set of digits from the memory in the mobile telecommunication terminal, the second set of digits identifying a second subscriber terminal in a telecommunication network;
reading second dictionary selection data from the memory, the second dictionary selection data being associated with the second set of digits and designating at least one dictionary stored in the memory;
determining if the first dictionary data and the second dictionary data correspond; and
if the first dictionary selection data and the second dictionary selection data correspond, selecting a second at least one dictionary stored in the memory based on the corresponding dictionary selection data, the second at least one dictionary replacing the first at least one dictionary.

9. The computer program product according to claim 8, further comprising computer readable program code for causing a computer to select at least one default dictionary stored in the memory if the first and second dictionary selection data do not correspond.

10. The computer program product according to claim 8, wherein selecting the at least one dictionary comprises:
determining, from a sequential structure of the plurality of digits, a country associated with the subscriber number; and
selecting at least one dictionary stored in the memory, the at least one dictionary being in a language corresponding to the country.

11. A system comprising:
a speaker;
an input module; and
a control unit connected to the speaker and input module, the control unit being configured to:
read a first set of digits from a memory in the system, the first set of digits identifying a subscriber terminal in a telecommunication network;
automatically select a first at least one dictionary associated with the first set of digits, where selecting the first at least one dictionary includes,
at least one of loading the address of a start of the first at least one dictionary for sequential reading and loading an entirety of the first at least one dictionary into a random access memory of the system,
reading dictionary selection data from a data record associated with the first set of digits and designating at least one dictionary stored in the memory; and
selecting the at least one designated dictionary based on the dictionary selection data;
determining if the first set of digits comprise a country code; and automatically selecting at least one dictionary that corresponds to a language associated with the country code;
receive at least one character associated with a data record or an incoming or outgoing message;
audibly present the at least one character in a language associated with the dictionary;
automatically form at least one word from the at least one character and audibly present the at least one word;
read a second set of digits from the memory in the system, the second set of digits identifying a second subscriber terminal in a telecommunication network;
read second dictionary selection data from the memory, the second dictionary selection data being associated with the second set of digits and designating at least one dictionary stored in the memory;

determine if the first dictionary data and the second dictionary data correspond; and if the first dictionary selection data and the second dictionary selection data correspond, select a second at least one dictionary stored in the memory based on the corresponding dictionary selection data, the second at least one dictionary replacing the first at least one dictionary.

12. The system according to claim 11, wherein at least one default dictionary stored in the memory is selected if the first and second dictionary selection data do not correspond.

13. The system according to claim 11, wherein selecting the at least one dictionary comprises:

determining, from a sequential structure of the plurality of digits, a country associated with the subscriber number; and selecting at least one dictionary stored in the memory, the at least one dictionary being in a language corresponding to the country.

14. A user interface comprising:

a speaker;

an input module; and a control unit connected to the speaker and input module, the control unit being configured to:

read a first set of digits from a memory, the first set of digits identifying a subscriber terminal in a telecommunication network;

automatically select a first at least one dictionary associated with the first set of digits, where selecting the first at least one dictionary includes, at least one of loading the address of a start of the first at least one dictionary for sequential reading and loading an entirety of the first at least one dictionary into a random access memory;

reading dictionary selection data from a data record associated with the first set of digits and designating at least one dictionary stored in the memory; and selecting the at least one designated dictionary based on the dictionary selection data;

determining if the first set of digits comprise a country code; and automatically selecting at least one dictionary that corresponds to a language associated with the country code;

receive at least one character associated with a data record or an incoming or outgoing message;

audibly present the at least one character in a language associated with the dictionary;

automatically form at least one word from the at least one character and audibly present the at least one word;

read a second set of digits from the memory, the second set of digits identifying a second subscriber terminal in a telecommunication network;

read second dictionary selection data from the memory, the second dictionary selection data being associated with the second set of digits and designating at least one dictionary stored in the memory;

determine if the first dictionary data and the second dictionary data correspond; and if the first dictionary selection data and the second dictionary selection data correspond, select a second at least one dictionary stored in the memory based on the corresponding dictionary selection data, the second at least one dictionary replacing the first at least one dictionary.

15. The user interface according to claim 14, wherein at least one default dictionary stored in the memory is selected if the first and second dictionary selection data do not correspond.

16. The user interface according to claim 14, wherein selecting the at least one dictionary comprises:

determining, from a sequential structure of the plurality of digits, a country associated with the subscriber number; and selecting at least one dictionary stored in the memory, the at least one dictionary being in a language corresponding to the country.

* * * * *